(12) United States Patent
Howlett et al.

(10) Patent No.: US 11,961,963 B2
(45) Date of Patent: Apr. 16, 2024

(54) ELECTROCHEMICAL CELL

(71) Applicant: DEAKIN UNIVERSITY, Geelong (AU)

(72) Inventors: Patrick C. Howlett, Box Hill South (AU); Maria Forsyth, Ashburton (AU); Douglas Robert Macfarlane, East Brighton (AU); Hyun Gook Yoon, Mount Waverley (AU)

(73) Assignee: DEAKIN UNIVERSITY, Geelong (AU)

( * ) Notice: Subject to any disclaimer, the term of this patent is extended or adjusted under 35 U.S.C. 154(b) by 590 days.

(21) Appl. No.: 15/575,021

(22) PCT Filed: May 20, 2016

(86) PCT No.: PCT/AU2016/050389
§ 371 (c)(1),
(2) Date: Nov. 17, 2017

(87) PCT Pub. No.: WO2016/183638
PCT Pub. Date: Nov. 24, 2016

(65) Prior Publication Data
US 2018/0151916 A1 May 31, 2018

(30) Foreign Application Priority Data
May 20, 2015 (AU) .................................. 2015901837

(51) Int. Cl.
*H01M 10/0566* (2010.01)
*H01G 11/06* (2013.01)
(Continued)

(52) U.S. Cl.
CPC ........ *H01M 10/0566* (2013.01); *H01G 11/06* (2013.01); *H01G 11/30* (2013.01);
(Continued)

(58) Field of Classification Search
CPC ........... H01M 10/0566; H01M 10/052; H01M 10/054; H01M 10/058; H01M 4/381;
(Continued)

(56) References Cited

U.S. PATENT DOCUMENTS

| 2014/0272607 A1 | 9/2014 | Amine et al. |
| 2015/0064574 A1 | 3/2015 | He et al. |

(Continued)

FOREIGN PATENT DOCUMENTS

| KR | 10-2014-0079426 A | 6/2014 |
| WO | WO-2014/171196 A1 | 10/2014 |

(Continued)

OTHER PUBLICATIONS

Wang et al ("Rechargeable Na/NaMnO2 cells with Ionic Liquid Electrolytes containing various sodium solutes" Journal of Power Sources 274 (2015) 1016-1023).*

(Continued)

*Primary Examiner* — Stephen J Yanchuk
(74) *Attorney, Agent, or Firm* — MARSHALL, GERSTEIN & BORUN LLP

(57) ABSTRACT

A sodium electrochemical cell that supports a current density at the negative electrode of at least 500 $\mu A/cm^2$, the electrochemical cell comprising (i) a negative electrode and (ii) a sodium-ion ionic liquid electrolyte having a sodium-ion concentration that is no less than 75% of its saturation limit in the electrolyte, wherein the negative electrode has a solid-electrolyte interphase (SEI) layer formed as a result of the electrochemical cell having undergone a polarisation cycle.

19 Claims, 17 Drawing Sheets

(51) Int. Cl.
| | |
|---|---|
| H01G 11/30 | (2013.01) |
| H01G 11/32 | (2013.01) |
| H01G 11/62 | (2013.01) |
| H01G 11/84 | (2013.01) |
| H01G 11/86 | (2013.01) |
| H01M 4/38 | (2006.01) |
| H01M 10/052 | (2010.01) |
| H01M 10/054 | (2010.01) |
| H01M 10/058 | (2010.01) |
| H01M 12/02 | (2006.01) |

(52) U.S. Cl.
CPC ............ *H01G 11/32* (2013.01); *H01G 11/62* (2013.01); *H01G 11/84* (2013.01); *H01G 11/86* (2013.01); *H01M 4/381* (2013.01); *H01M 10/052* (2013.01); *H01M 10/054* (2013.01); *H01M 10/058* (2013.01); *H01M 12/02* (2013.01); *H01M 2300/0045* (2013.01)

(58) Field of Classification Search
CPC ............ H01M 12/005; H01M 12/02; H01M 2300/0045; H01M 4/364; H01G 11/06; H01G 11/30; H01G 11/62; H01G 11/86; H01G 11/58; H01G 11/32; H01G 11/84; Y02E 60/10; Y02P 70/50
See application file for complete search history.

(56) References Cited

U.S. PATENT DOCUMENTS

| | | | |
|---|---|---|---|
| 2015/0140446 A1* | 5/2015 | Li ..................... | H01M 10/052 429/332 |
| 2015/0318530 A1* | 11/2015 | Yushin ................ | H01M 10/36 429/131 |
| 2016/0079632 A1 | 3/2016 | Fukunaga et al. | |
| 2016/0126599 A1* | 5/2016 | Fukunaga ........... | H01M 10/399 429/112 |
| 2016/0240896 A1* | 8/2016 | Zhang ................ | H01M 10/0569 |
| 2016/0261000 A1* | 9/2016 | Zhang ................ | H01M 10/0568 |
| 2016/0285130 A1* | 9/2016 | Meng ................. | H01M 10/345 |

FOREIGN PATENT DOCUMENTS

| | | |
|---|---|---|
| WO | WO-2014/185125 A1 | 11/2014 |
| WO | WO-2015/072577 A1 | 5/2015 |

OTHER PUBLICATIONS

Wongittharom et la ("Electrochemical Performance of Na/NaFEPO4 sodium-ion batteries with ionic liquid electrolytes". J.Mater. Chem. A 2014. 2. 5655).*

Wang et al ("Rechargeable Na/NaMnO cells with ionic liquid electrolytes containing various sodium solutes". Journal of Power Sources 274. Jan. 15, 2015. p. 1016-1023).*

Chagas et al. ("Unexpected performance of layered sodium-ion cathode material in ionic liquid-based electrolyte". Journal of Power Source. Sources 247 (2014) p. 377-383).*

Armel et al., Ionic liquids and organic ionic plastic crystals utilizing small phosphonium cations, J. Mater. Chem., 21(21):7640 (2011).

Bruce et al., Steady state current flow in solid binary electrolyte cells, J. Electroanalytical Chem. Interfacial Electrochem., 225(1-2):1-17 (1987).

Ding et al., Na[FSA]-[C3C1pyrr][FSA] ionic liquids as electrolytes for sodium secondary batteries: Effects of Na ion concentration and operation temperature, J. Power Sources, 269:124-8 (2014).

Ding et al., NaFSA-C1C3pyrFSA ionic liquids for sodium secondary battery operating over a wide temperature range, J. Power Sources, 238:296-300 (2013).

Eshetu et al., Energy Storage Materials Synthesized from Ionic Liquids, Angew. Chem. Int. Ed., 53(49):13342-59 (2014).

International Application No. PCT/AU2016/050389, International Preliminary Report on Patentability, dated Nov. 21, 2017.

International Application No. PCT/AU2016/050389, International Search Report and Written Opinion, dated Aug. 1, 2016.

Komaba et al., Electrochemical Na insertion and solid electrolyte interphase for hard-carbon electrodes and application to Na-Ion batteries, Adv. Funct. Mater., 21:3859-67 (2011).

Kundu et al., The emerging chemistry of sodium ion batteries for electrochemical energy storage, Angew. Chem. Int. Ed. Engl., 54(11):3431-48 (2015).

Palomares et al., Na-ion batteries, recent advances and present challenges to become low cost energy storage systems, Energy & Environmental Sci., 5:5884-901 (2012).

Yabuuchi et al., Research development on sodium-ion batteries, Chem. Rev., 114(23):11636-82 (2014).

Yoon et al., Physicochemical properties of N-propyl-N-methylpyrrolidinium bis(fluorosulfonyl)imide for sodium metal battery applications, Phys. Chem. Chem Phys., 16924):12350-5 (2014).

Office Action in corresponding Korean patent application No. 10-2017-7035665, dated May 31, 2023.

* cited by examiner

ELECTROCHEMICAL CELL

FIELD OF THE INVENTION

The invention relates in general to electrochemical cells, and in particular to sodium electrochemical cells.

BACKGROUND OF THE INVENTION

Electrochemical cells are devices capable of converting chemical potential energy into electrical energy. Applications of electrochemical cells span across a wide range of technologies, from energy production to energy storage. Examples include electric diagnostic devices, batteries, and electrochemical devices.

Sodium electrochemical cells are receiving increasing attention as a potential substitute for the ubiquitous lithium-ion cells. The main motivation for this stems from concerns about future supply of lithium given the growing demand and geographical localisation of known lithium mineral deposits.

In contrast, sodium mineral deposits are vast, attainable at low cost, and geographically well distributed. In addition, given a number of similarities between the chemistry and format of lithium and sodium-based cells, there is potential for sodium-based cell technology to retrofit into existing technology used to industrially manufacture lithium-based cells.

However, there remain a number of challenges with realising the full commercial potential of sodium cell technology. For example, current sodium technology typically operates at high temperatures (−300° C.) to maintain at least the negative electrode and electrolyte in a molten state. This is required to achieve practical high ion mobility in the electrolyte and low charge transfer resistance between the negative electrode and the electrolyte. As will be appreciated, this limits the practical and commercial applicability of these cells.

There remains an opportunity to therefore address or ameliorate one or more disadvantage or shortcoming associated with current sodium electrochemical cells with a mind to enabling their practical and commercial applicability.

SUMMARY OF THE INVENTION

The present invention provides a sodium electrochemical cell that supports a current density at the negative electrode of at least 500 $\mu A/cm^2$, the electrochemical cell comprising (i) a negative electrode, and (ii) a sodium-ion ionic liquid electrolyte having a sodium-ion concentration that is no less than 75% of its saturation limit in the electrolyte, wherein the negative electrode has a solid-electrolyte interphase (SEI) layer formed as a result of the electrochemical cell having undergone a polarisation cycle.

It has now surprisingly been found that subjecting a sodium electrochemical cell of the type according to the invention to a polarisation cycle promotes a number of unique and unexpected changes in the cell. As an example, and without wishing to be limited by theory, it is believed during the polarisation cycle the high sodium-ion concentration in the electrolyte promotes formation of a unique SEI layer at the negative electrode.

While by all accounts ion conductivity data measured on conventional sodium-ion ionic liquid electrolyte cell systems suggest that optimal ion conductivity will be achieved at low sodium-ion concentrations, it has nevertheless surprisingly been found that as a result of having undergone a full polarisation cycle cells that use an electrolyte with high sodium-ion concentration can in fact support high current densities at the negative electrode.

Without wishing to be limited by theory, it is believed this surprising effect results from interaction between the negative electrode and the sodium-ionic liquid electrolyte having high sodium-ion concentration to at least provide for a particularly low-resistance SEI layer, which in turn results in faster ion and charge transfer through the SEI layer. Cells with this unique SEI layer can advantageously demonstrate remarkable stability and fast rate of switching when supporting alternating currents, for example when subjected to multiple polarisation cycles and/or during multiple charge/discharge cycles.

Advantageously, such cells can support high current densities at the negative electrode and can operate over a wider temperature range than conventional sodium electrochemical cells. Further, this temperature range advantageously includes room temperature, thereby making cells of the present invention applicable on a wider commercial scale compared to existing sodium cells.

Those skilled in the art will appreciate that as a "cell", the cell according the present invention will generally comprise at least one other electrode such as a counter electrode or a positive electrode.

In some embodiments, the sodium electrochemical cell of the invention comprises a counter electrode. In such embodiments the cell can be referred to as being in a half-cell configuration and the negative electrode functions as a working electrode. Advantageously, when in a half-cell configuration the cell of the invention can find application as a diagnostic or testing device for positive electrodes. For example, the cell of the invention may be used as a testing device to identify suitable positive electrodes for use in a full-cell configuration.

In some embodiments the sodium electrochemical cell of the invention comprises a positive electrode. In such embodiments the cell can be referred to as being in a full-cell configuration. In that configuration, the ability to (i) support high current density at the negative electrode, and (ii) sustain a high number of polarisation or charge/discharge cycles, makes the cells suitable for the production of high capacity and cycle-stable sodium rechargeable batteries.

In other embodiments, the positive electrode is in the form of a capacitor, for example a carbon capacitor. In that case, the present invention provides a sodium electrochemical cell that supports a current density at the negative electrode of at least 500 $\mu A/cm^2$, the electrochemical cell comprising (i) a negative electrode, (ii) a positive electrode in the form of a capacitor and (iii) a sodium-ion ionic liquid electrolyte having a sodium-ion concentration that is no less than 75% of its saturation limit in the electrolyte, wherein the negative electrode has a solid-electrolyte interphase (SEI) layer formed as a result of the electrochemical cell having undergone a polarisation cycle.

A sodium electrochemical cell comprising a combination of a positive electrode in the form of a capacitor and sodium-ion ionic liquid electrolyte as described herein is believed to be unique in its own right.

The present invention therefore also provides a sodium electrochemical cell comprising a negative electrode, a positive electrode in the form of a capacitor and a sodium-ion ionic liquid electrolyte, wherein and the sodium-ion concentration in the electrolyte is no less than 75% of its saturation limit in the electrolyte.

The present invention also provides a sodium electrochemical cell comprising a negative electrode, a positive electrode in the form of a capacitor and a sodium-ion ionic liquid electrolyte.

Advantageously, a positive electrode in the form of a capacitor is believed to facilitate sodium-ion absorption/desorption at the interface with the electrolyte while maintaining high electron mobility at the positive electrode.

In one embodiment, the capacitor is in the form of a carbon capacitor.

The present invention also provides a method of manufacturing a sodium electrochemical cell which (i) comprises a negative electrode and a sodium-ion ionic liquid electrolyte having a sodium-ion concentration that is no less than 75% of its saturation limit in the electrolyte, and (ii) supports a current density at the negative electrode of at least 500 $\mu A/cm^2$, the method comprising (i) bringing into contact with the negative electrode the sodium-ion ionic liquid electrolyte, and (ii) performing a polarisation cycle of the cell so as to form at the negative electrode a solid-electrolyte interphase (SEI) layer.

Where the sodium electrochemical cell comprises a counter electrode or a positive electrode the method of manufacturing the cell may comprise bringing into contact with the negative and counter electrode (or the negative and positive electrode) the sodium-ion ionic liquid electrolyte.

The invention further provides use of a sodium-ion ionic liquid electrolyte having a sodium-ion concentration that is no less than 75% of its saturation limit in the electrolyte to produce a sodium electrochemical cell that supports a current density at the negative electrode of at least 500 $\mu A/cm^2$, the electrochemical cell comprising a negative electrode having a solid-electrolyte interphase (SEI) layer formed as a result of the electrochemical cell having undergone a polarisation cycle in the presence of the sodium-ion ionic liquid electrolyte.

The invention also provides a sodium rechargeable battery that supports a current density at the negative electrode of at least 500 $\mu A/cm^2$, the battery comprising (i) a negative electrode, (ii) a positive electrode and (iii) a sodium-ion ionic liquid electrolyte having a sodium-ion concentration that is no less than 75% of its saturation limit in the electrolyte, wherein the negative electrode has a solid-electrolyte interphase (SEI) layer formed as a result of the battery having undergone a polarisation cycle.

Further aspects and/or embodiments of the invention are discussed in more detail below.

BRIEF DESCRIPTION OF THE DRAWINGS

Embodiments of the invention will be now described with reference to the following non-limiting drawings, in which.

Figure 1:
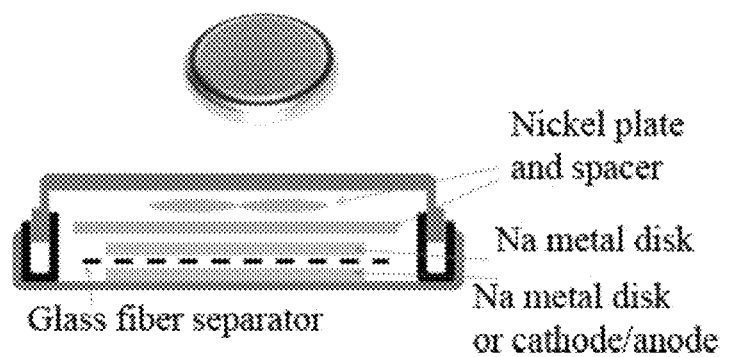
FIG. 1 is a schematic view of an electrochemical cell in accordance with an embodiment of the invention.

Some Figures contain colour representations or entities. Coloured versions of the Figures are available upon request.

DETAILED DESCRIPTION OF THE INVENTION

The sodium electrochemical cell of the invention comprises a negative electrode and a sodium-ion ionic liquid electrolyte.

As used herein, the expression "sodium electrochemical cell" is intended to mean a cell that converts chemical energy to electrical energy or converts electrical energy to chemical energy based on the specific interaction between sodium ions and the negative electrode. Examples of such interactions include chemical oxidation/reduction, intercalation and alloying-dealloying. As it is understood in the art, these specific interactions also involve collective migration of electrons within the negative electrode, which can therefore generate electric current in an external electric circuit connected to the negative electrode.

In the context of the present invention, the term "intercalation" used herein refers to the reversible insertion of sodium ions into the atomic structure of an electrode, for example between atomic layers inherently present in the atomic structure of the electrode or into interstitial locations existing within the atomic structure of the electrode.

As used herein, the expression "oxidation/reduction" refers to chemical reactions in which atoms (including atoms other than sodium) have their oxidation state changed as a result of an electron transfer between species. In this context, "oxidation/reduction" embraces a reversible change of the oxidation state of sodium as well as a change of the oxidation state of a species forming the electrode material that accompanies an interaction (e.g. absorption/desorption) between the electrode and sodium-ions.

In the context of the present invention, the expression "alloying/dealloying" used herein indicates a mechanism providing for the reversible and intimate amalgamation of sodium-ions within the atomic structure of the electrode.

As used herein, and as a person skilled in the art would know, the expression "negative electrode" refers to the electrode at which electrons leave the cell during discharge. For example, in the context of the cells of the present invention the negative electrode refers to the electrode at which electrons leave the cell during discharge as a consequence of an interaction between the electrode and the sodium-ions of the kind described herein (i.e.

intercalation, oxidation/reduction and/or alloying/dealloying). By reference to its functionality during discharge, the negative electrode is also commonly referred to in the art as an "anode".

A negative electrode of the cell according to the invention is not limited to any particular electrode material provided that features of the defined invention are met. For example, when in electrical contact with the sodium-ion ionic liquid electrolyte used according to the invention, the negative electrode material may be required to give rise to (i) the formation of a SEI layer as a result of the electrochemical cell having undergone a polarisation cycle, and (ii) a cell that supports a current density at the negative electrode of at least 500 μA/cm$^2$.

The negative electrode may comprise (or be made of) materials that can reversibly intercalate sodium ions within their atomic structure, interact with sodium ions (e.g. absorption/desorption) by promoting reversible oxidation/reduction reactions, or promote alloying/dealloying reactions with sodium.

The expressions "negative electrode may comprise" and "negative electrode may be made of" are intended to be a reference the composition of the negative electrode per se, absent electrolyte material.

Examples of material which the negative electrode may comprise (or be made of) include expanded graphite, low potential transition-metal oxides and phosphates such as NASICON-type NaTi$_2$(PO$_4$)$_3$, vanadates such as vanadium layered oxides (e.g. O$_3$—NaVO$_2$ and P$_2$—Na$_{0.7}$VO$_2$), titanates such as Na$_2$Ti$_3$O$_7$, NaTi$_3$O$_6$(OH)·2H$_2$O, Na$_2$Ti$_6$O$_{13}$, TiNb$_2$O$_7$, Na$_{0.66}$Li$_{0.22}$Ti$_{0.78}$O$_2$, Na$_{0.6}$Ni$_{0.3}$Ti$_{0.7}$O$_2$ and titanates/carbon black composites, alloying materials such as antimony, tin, phosphorus and their combinations (e.g. Sn—Sb alloys), tin-based composites such as tin powder/resin (e.g. polyacrylate), microcrystalline antimony-based composites such as microcrystalline antimony-black carbon electrodes, amorphous phosphorus, sodium (including solid sodium), and combinations thereof.

In some embodiments, the negative electrode comprises sodium. In other embodiments, the negative electrode consists essentially of sodium. In yet other embodiments, the negative electrode comprises sodium metal. In yet other embodiments, the negative electrode consists essentially of sodium metal. In some embodiments, the sodium metal is in a solid state. Again, this is in the context of the composition of the negative electrode per se, absent electrolyte material.

In other embodiments, the negative electrode comprises sodium and carbon. For convenience, an electrode comprising sodium and carbon will herein also be referred to as an electrode comprising a "sodium/carbon composite".

A sodium electrochemical cell comprising a sodium/carbon composite negative electrode and the sodium-ion ionic liquid electrolyte as described herein is believed to be unique and advantageous in its own right.

Accordingly, the present invention also provides a sodium electrochemical cell including (i) a negative electrode comprising a sodium/carbon composite and (ii) a sodium-ion ionic liquid electrolyte, wherein the sodium-ion concentration in the electrolyte is no less than 75% of its saturation limit in the electrolyte. In some embodiments, that cell supports a current density at the negative electrode as described herein. In other embodiments, that cell comprises a positive electrode in the form of a capacitor, for example a carbon capacitor. In other embodiments, the negative electrode of that cell has a solid-electrolyte interphase (SEI) layer formed as a result of the electrochemical cell having undergone a polarisation cycle. Other relevant features of the sodium electrochemical cell disclosed herein will be understood as being relevant to that further aspect of the invention.

Other examples of material which the negative electrode may comprise (or be made of) include those disclosed in Dipan Kundu, Elahe Talaie, Victor Duffort, and Linda F. Nazar, *The Emerging Chemistry of Sodium Ion Batteries for Electrochemical Energy Storage*, Angewandte Chemie Int. Ed. 2015, volume 54, pages 3431; Veronica Palomares, Paula Serras, Irune Villaluenga, Karina B. Hueso, Javier Carretero-Gonzalez, and Teofilo Rojo, *Na-ion batteries,* recent advances and present challenges to become low cost energy storage systems, Energy & Environmental Science 2012, volume 5, page 5884; Gebrekidan Gebresilassie Eshetu, Michel Armand, Bruno Scrosati, and Stefano Passerini, *Energy Storage Materials Synthesized from Ionic Liquids* Angewandte Chemie Int. Ed.

2014, volume 53, page 13342; N. Yabuuchi, K. Kubota, M. Dahbi, and S. Komaba, *Chemical Review* 2014, volume 114, page 11636, the contents of which are included herein in their entirety.

A sodium electrochemical cell of the invention comprises a sodium-ion ionic liquid electrolyte. As used herein, the expression "sodium-ion ionic liquid electrolyte" refers to an ionic liquid obtained by dissolving a sodium salt into an organic salt. In some embodiments, the sodium salt is the sodium salt equivalent of the organic salt (i.e. they share the same anion).

Sodium-ion ionic liquid electrolytes suitable for use in a cell of the invention are not particularly limited, provided cell criteria is met and they present in liquid form at the temperature of use of the cell.

Surprisingly, use of the sodium-ion ionic liquid electrolyte according to the invention allows the cell to effectively and efficiently operate at lower temperatures than those required by conventional sodium based cells, resulting in at least improved performance and safety.

The sodium-ion ionic liquid electrolyte used in accordance with the invention may comprise one or more organic salts selected from 1-butyl-3-methylimidazolium bisulfate ([$C_4$mim][$HSO_4$]), 1-alkyl-3-methylimidazolium bromide ([$C_n$mim][Br]), 1-hexadecyl-3-methylimidazolium chloride ([$C_{16}$mim][Cl]), 1-octyl-3-methylimidazolium chloride ([$C_8$mim][Cl]), 1-butyl-3-methylimidazolium tetrafluoroborate ([$C_4$mim][$BF_4$]), 1-octyl-3-methylimidazolium tetrafluoroborate ([$C_8$mim][$BF_4$]), 1-ethyl-3-methylimidazolium bis(tri-fluoromethanesulfonyl)imide ([$C_2$mim][$Tf_2$N]), 1-butyl-3-methylimidazolium chloride ([$C_4$mim][Cl]), 1-hexyl-3-methylimidazolium tetrachloroferrate(III) ([$C_6$mim][$FeCl_4$]), 1-propyl-3-methylimidazolium iodide ([$C_3$mim][I]), 1-ethyl-3-methylimidazolium trifluoromethanesulfonate ([$C_2$mim][OTf]), 1-alkyl-3-methylimidazolium triflate ([$C_n$mim][Tf]), 1-ethyl-3-methylimidazolium acetate ([$C_2$mim][OAc]), N-butyl-N-methylpyrrolidinium bis(trifluoromethane sulfonyl) amide ([$C_4$mPyr][$Tf_2$N]) or ([$C_4$mpy][$Tf_2$N])), 1-ethyl-3-methylimidazolium tetrafluoroborate ([$C_2$mim][$BF_4$]), 1-dodecyl-3-methylimidazolium bromide ([$C_{12}$mim][Br]), 1-octyl-3-methylimidazolium bis(tri-fluoromethanesulfonyl)imide ([$C_8$mim][$Tf_2$N]), 1-hexadecyl-3-methylimidazolium bis(tri-fluoromethanesulfonyl)imide ([$C_{16}$mim][$Tf_2$N]), 1-ethyl-3-methylimidazolium chloride ([$C_2$mim][Cl]), 1-(3-aminopropyl)-3-methylimidazolium bromide ([[(3-aminopropyl)mim][Br]), 1,2-dimethyl-3-butylimidazolium bis(trifluoromethane sulfonyl) amide ([$C_4$(2-$C_1$)mim][$Tf_2$N]), 1-butyl-3-methylimidazolium dicyanamide ([$C_4$mim][N(CN)$_2$]), 1-hexadecyl-3-methylimidazolium tetrafluoroborate ([$C_{16}$mim][$BF_4$]), 1-butyl-3-methylimidazolium hexafluorophosphate ([$C_4$mim][$PF_6$]), 1-butyl-3-methylimidazolium bis(trifluoromethanesulfonyl)imide ([$C_4$mim][$Tf_2$N]), 1-butyl-1-methylpyrrolidinium bis(trifluoromethanesulfonyl)imide ([$C_4$mpyr][$Tf_2$N]), 1-butyl-3-methylimidazolium tetrachloroferrate(III) ([$C_4$mim][$FeCl_4$]), 1-ethyl-3-methylimidazolium bromide ([$C_2$mim][Br]), 1-hexadecyl-3-methylimidazolium bromide ([$C_{16}$mim][Br]), 1,2-dimethyl-3-(3-hydroxypropyl)imidazolium bis(trifluoromethanesulfonyl)imide ($C_2$—OH) N-ethyl-tris(2-(2-methoxyethoxy)ethyl)ethane ammonium bis(fluorosulfonyl)imide [$N_{2(2O2O1)_3}$][FSI]) and N-ethyl-tris (2-(2-methoxyethoxy)ethyl)ethane ammonium bis(trifluoromethanesulfonyl)imide ([$N_{2(2O2O1)_3}$][TFSI]).

In some embodiments, the sodium-ion ionic liquid electrolyte used in accordance with the invention may comprise one or more organic salts comprising a salt selected from bis(tri-fluoromethanesulfonyl)imide ([$Tf_2$N], or [TFSI]), bis(fluorosulfonyl)imide ([FSI]), or combinations thereof. For example, the organic salt comprises 1-butyl(propyl)-1-methylpyrrolidinium bis(trifluoromethylsulfonyl)imide ([$C_4C_3$mpyr][TFSI]), and N-methyl-N-propylpyrrolidinium bis(fluorosulfonyl)imide ([$C_3$mpyr][FSI]).

Organic salts suitable for use to form the electrolyte of the invention may also comprise any one, or any combinations of, those disclosed in Gebrekidan Gebresilassie Eshetu, Michel Armand, Bruno Scrosati, and Stefano Passerini, *Energy Storage Materials Synthesized from Ionic Liquids* Angewandte Chemie Int. Ed. 2014, volume 53, page 13342, the content of which is included herein in its entirety.

The sodium-ion ionic liquid electrolyte used in accordance with the invention may also comprise one or more organic salts selected from phosphorous analogues of the organic salts disclosed herein. By phosphorous "analogues" of the organic salts disclosed herein it is meant organic salts sharing the same chemical structure as the organic salts disclosed herein with phosphorous atoms replacing the nitrogen atoms.

Accordingly, the sodium-ion ionic liquid electrolyte used in accordance with the invention may comprise one or more organic salts selected from trihexyl(tetradecyl)phosphonium bis(trifluoromethanesulfonyl)imide ([$P_{66614}$][$Tf_2$N]), trihexyl(tetradecyl)phosphonium bis(fluorosulfonyl)imide ([$P_{66614}$][FSI]), diethyl(methyl)(isobutyl)phosphonium bis(trifluoromethanesulfonyl)amide ([$P_{1224}$][$Tf_2$N]), diethyl (methyl)(isobutyl)phosphonium bis(fluoromethanesulfonyl) amide ([$P_{1224}$][FSI]), triisobutyl(methyl)phosphonium bis(trifluoromethanesulfonyl)imide ([$P_{1444}$][$Tf_2$N]), triisobutyl (methyl)phosphonium bis(fluoromethanesulfonyl)imide ([$P_{1444}$][FSI]), triethyl(methyl)phosphonium bis(trifluoromethanesulfonyl)imide ([$P_{1222}$][$Tf_2$N]), triethyl(methyl) phosphonium bis(fluoromethanesulfonyl)imide ([$P_{1222}$][FSI]), trimethyl (isobutyl)phosphonium bis(trifluoromethanesulfonyl)imide ([$P_{111i4}$][$Tf_2$N]), and trimethyl(isobutyl)phosphonium bis(fluoromethanesulfonyl)imide ([$P_{111i4}$][FSI])

Phosphorous-based organic salts suitable for use to form the electrolyte of the invention may also comprise any one, or any combinations of those disclosed in Armel, V. et al., *Ionic Liquids and Organic Ionic Plastic Crystals Utilizing Small Phosphonium Cations*, Journal of Materials Chemistry 2011, 21 (21), 7640 (the content of which is included herein in its entirety) insofar it/they provide(s), when combined with a sodium salt as disclosed herein, for a sodium-ion ionic liquid electrolyte.

Accordingly, in some embodiments the sodium-ion ionic liquid electrolyte comprises a phosphorous-based organic salt. The present invention therefore also provides a sodium electrochemical cell that supports a current density at the negative electrode of at least 500 $\mu$A/cm$^2$, the electrochemical cell including (i) a negative electrode, and (ii) a sodium-ion ionic liquid electrolyte (a) comprising a phosphorous-based organic salt, and (b) having a sodium-ion concentration that is no less than 75% of its saturation limit in the electrolyte, wherein the negative electrode has a solid-electrolyte interphase (SEI) layer formed as a result of the electrochemical cell having undergone a polarisation cycle.

Use of phosphorous-based organic salts in the formulation of the sodium-ion ionic liquid electrolyte provides for electrolytes that can offer certain unexpected advantages over their nitrogen-based counterparts. For example, a low viscosity of certain phosphorous-based cations can result in electrolytes having higher electric conductivity relative to their nitrogen-based counterparts. As a result, electrochemical cells having a phosphorous-based electrolyte can have a higher discharge capacity than cells that use a corresponding nitrogen-based electrolyte. In addition, phosphorous-based electrolytes can be more thermally and electrochemically stable than their nitrogen-based counterparts, adding to the overall safety and durability of the resulting cell.

Sodium electrochemical cells with sodium-ionic liquid electrolytes comprising a phosphorous-based organic salt are believed to be unique and advantageous in their own right.

Accordingly, a further aspect of the present invention relates to a sodium electrochemical cell that supports a current density at the negative electrode of at least 500 $\mu A/cm^2$, the electrochemical cell including (i) a negative electrode, and (ii) a sodium-ion ionic liquid electrolyte (a) comprising a phosphorous-based organic salt, and (b) having a sodium-ion concentration that is no less than 75% of its saturation limit in the electrolyte. In some embodiments, the negative electrode has a solid-electrolyte interphase (SEI) layer formed as a result of the electrochemical cell having undergone a polarisation cycle. It will be understood the phosphorous-based organic salts disclosed herein would be suitable for use in this aspect of the invention. Similarly, other features of the sodium electrochemical cell disclosed herein will be understood as being relevant to this further aspect of the invention.

The sodium-ion ionic liquid electrolyte used in accordance with the invention may also comprise one or more organic salts selected from those described herein that incorporate an alkoxy ether functionality in the cation side chain (e.g. by replacing an alkyl chain on the cation).

In some embodiments, the sodium-ion ionic liquid electrolyte used in accordance with the invention comprises one or more sodium salts selected from sodium bis(tri-fluoromethane)sulfonimide (Na[TFSI]), sodium (bis(fluorosulfonyl)imide (Na[FSI]), sodium triflate (NaOTf), sodium perchlorate (NaClO$_4$), sodium tetrafluoroborate (NaBF$_4$) and sodium hexafluorophosphate (NaPF$_6$).

In some embodiments, the sodium-ion ionic liquid electrolyte comprises Na[TFSI] and [C$_3$mpyr][TFSI], Na[TFSI] and [C$_4$C$_3$mpyr][TFSI], Na[TFSI] and [C$_3$mpyr][FSI], Na[TFSI] and [C$_4$C$_3$mpyr][FSI], Na[FSI] and [C$_3$mpyr][TFSI], Na[FSI] and [C$_4$C$_3$mpyr][TFSI], Na[FSI] and [C$_3$mpyr][FSI], Na[FSI] and [C$_4$C$_3$mpyr][FSI], or combinations thereof.

In some embodiments, the sodium-ion ionic liquid electrolyte comprises Na[TFSI] and [P$_{111i4}$][TFSI], Na[TFSI] and [P$_{1222}$][TFSI], Na[TFSI] and [P$_{111i4}$][FSI], Na[TFSI] and [P$_{1222}$][FSI], Na[FSI] and [P$_{111i4}$][TFSI], Na[FSI] and [P$_{1222}$][TFSI], Na[FSI] and [P$_{111i4}$][FSI], Na[FSI] and [P$_{1222}$][FSI], Na[TFSI] and [P$_{1224}$][TFSI], Na[TFSI] and [P$_{1444}$][TFSI], Na[TFSI] and [P$_{1224}$][FSI], Na[TFSI] and [P$_{1444}$][FSI], Na[FSI] and [P$_{1224}$][TFSI], Na[FSI] and [P$_{1444}$][TFSI], Na[FSI] and [P$_{1224}$][FSI], Na[FSI] and [P$_{1444}$][FSI] or combinations thereof.

According to the invention the sodium-ion concentration in the electrolyte is no less than 75% of its saturation limit in the electrolyte. For avoidance of doubt, the concentration of sodium-ion in the electrolyte is the mol % of sodium-ion (i.e. sodium) relative to the total moles of sodium salt and organic salt.

As used herein, the expression "saturation limit in the electrolyte" is intended to mean the highest concentration of sodium ions in the electrolyte at which there is no precipitation of sodium salt out of the electrolyte at a given temperature. In other words, the sodium-ion concentration is at its saturation limit in the electrolyte at a given temperature if further sodium salt added into the electrolyte will not dissolve.

The saturation limit of sodium-ion in the electrolyte at a reference temperature is the concentration that can be conveniently measured according to standard procedure known in the art. According to such procedure a progressively increasing amount of sodium salt is added to the organic salt at an initial temperature, the initial temperature being higher than the reference temperature at which the saturation limit is to be determined. The addition of sodium salt continues until formation of a visible precipitate of undissolved salt, indicating that the saturation limit is exceeded. The temperature is then decreased to the reference temperature, resulting in further sodium salt precipitating out of the organic salt. Once precipitation of sodium salt ceases the total amount of sodium salt precipitate is determined by separating the precipitate from the solution using means that would be known to the skilled person. The sodium-ion saturation limit at the reference temperature is calculated as the difference between the total sodium salt added to the organic salt and the amount of sodium salt precipitate.

By the sodium-ion concentration being "no less than 75% of its saturation limit in the electrolyte" it is intended a sodium-ion concentration within a range of from 75% to 100% of its saturation limit in the electrolyte. For example, if at a given temperature the saturation limit of sodium-ion in the electrolyte is 60 mol %, then the sodium-ion concentration in the electrolyte according to the invention would be no less than 45 mol % (45 mol % being 75% of 60 mol %). In other words, in that example the concentration of the electrolyte according to the invention would be within a range of from 45 mol % to 60 mol %.

In some embodiments, the concentration of sodium-ion in the electrolyte is no less than 76%, no less than 77%, no less than 78%, no less than 79%, no less than 80%, no less than 81%, no less than 82%, no less than 83%, no less than 84%, no less than 85%, no less than 86%, no less than 87%, no less than 88%, no less than 89%, no less than 90%, no less than 91%, no less than 92%, no less than 93%, no less than 94%, no less than 95%, no less than 96%, no less than 97%, no less than 98%, or no less than 99% of its saturation limit in the electrolyte. In some embodiments, the concentration of sodium-ion in the electrolyte is at its saturation limit.

For avoidance of doubt, in the context of the invention the saturation limit of the electrolyte is intended to be at least that which presides at the operating temperature of the cell. By "operating temperature of the cell" is meant the temperature at which the cell is put into function, for example when the SEI layer is formed, during discharge while powering an external load attached to the electrodes, and/or during charge. In other words, at the operating temperature of the cell the sodium-ion ionic liquid electrolyte has a sodium-ion concentration that is no less than 75% of its saturation limit in the electrolyte.

In addition to being no less than 75% of its saturation limit in the electrolyte, in some embodiments the sodium-ion concentration in the electrolyte may also be 40 mol %, 50 mol %, or higher. For example, the molar concentration the sodium-ion in the electrolyte may be at least 40 mol %, 50 mol %, 55 mol %, 60 mol %, 65 mol %, 70 mol %, 80 mol %, or 90 mol %.

Cells using sodium-ion ionic liquid electrolyte have been reported (e.g. C. Ding et al, *Na[FSA]-[C₃C₁pyrr][FSA] ionic liquids as electrolytes for sodium secondary batteries: Effects of Na ion concentration and operation temperature*, Journal of Power Sources 2014, volume 269, page 124, herein "Ding").

However, the focus in Ding is principally using a cell configuration with a $NaCrO_2$ positive electrode and relates to tests performed at specific discharge currents applied and measured relative to the positive electrode. Ding teaches use of an electrolyte with sodium salt concentrations not exceeding 40 mol % for high operating temperatures (about 90° C.), and as low as 25 mol % for low operating temperatures (−20° C. to 0° C.). In other words, the specific cell configuration with a $NaCrO_2$ positive electrode described in Ding makes it impossible to appreciate the possibility to obtain higher currents at the negative electrode by using an electrolyte with a sodium salt concentration approaching its saturation limit in the electrolyte.

The sodium electrochemical cell of the invention supports a current density at the negative electrode of at least 500 $\mu A/cm^2$.

By specifying that the cell "supports" a certain current density at the negative electrode is meant the cell per se attains that current density characteristic during a state in which electric current is flowing through the negative electrode. As known in the art, such intrinsic characteristics of an electrochemical cell are typically referenced in the context of the cell during its operation. However, by specifying the cell per se attains that characteristic is not intended to be a limitation to the cell in use. Provided the cell can attain the characteristic, the cell will of course "support" that characteristic whether or not in use.

In other words, the present invention provides for a sodium electrochemical cell that is capable of supporting a current density at the negative electrode of at least 500 $\mu A/cm^2$.

In this context, reference to the cell that "supports" or is "capable of supporting" a certain current density at the negative electrode is meant that when in a state in which electric current is flowing through the negative electrode the cell allows that certain current density to flow through the negative electrode without compromising the electrochemical integrity of the cell.

Accordingly, reference to the cell supports (or is capable of supporting) a current density at the negative electrode of at least 500 $\mu A/cm^{2 1,}$ relates to the ability of the cell per se to attain the current density characteristic when, for example, the cell is connected to an external electrical component or portion of an electric circuit that provides or consumes electric power, such as a power supply or an electric load. Those skilled in the art could readily seek out suitable power supplies or electric loads that would generate, when connected to the cell of the invention, electric current flowing through the negative electrode.

A cell according to the invention will of course support the current density characteristic when in use.

Accordingly, in one embodiment the invention provides a sodium electrochemical cell that, when in use, has a current density at the negative electrode of at least 500 $\mu A/cm^2$.

In other words, the present invention further provides a sodium electrochemical cell that, when in use, has a current density at the negative electrode of at least 500 $\mu A/cm^2$, the electrochemical cell comprising (i) a negative electrode, and (ii) a sodium-ion ionic liquid electrolyte having a sodium-ion concentration that is no less than 75% of its saturation limit in the electrolyte, wherein the negative electrode has a solid-electrolyte interphase (SEI) layer formed as a result of the electrochemical cell having undergone a polarisation cycle.

In some embodiments, the sodium electrochemical cell of the invention supports a current density at the negative electrode of at least 600 $\mu A/cm^2$, at least 700 $\mu A/cm^2$, at least 800 $\mu A/cm^2$, at least 900 $\mu A/cm^2$, at least 1,000 $\mu A/cm^2$, at least 1,100 $\mu A/cm^2$, at least 1,200 $\mu A/cm^2$, at least 1,300 $\mu A/cm^2$, at least 1,400 $\mu A/cm^2$, at least 1,500 $\mu A/cm^2$, at least 1,600 $\mu A/cm^2$, at least 1,700 $\mu A/cm^2$, at least 1,800 $\mu A/cm^2$, at least 1,900 $\mu A/cm^2$, or at least 2,000 $\mu A/cm^2$.

In some embodiments, the sodium electrochemical cell of the invention supports a current density at the negative electrode up to 2,500 $\mu A/cm^2$.

In some embodiments, the sodium electrochemical cell of the invention supports a current density at the negative electrode of from 500 $\mu A/cm^2$ to 2,500 $\mu A/cm^2$, of from 600 $\mu A/cm^2$ to 2,500 $\mu A/cm^2$, of from 700 $\mu A/cm^2$ to 2,500 $\mu A/cm^2$, of from 800 $\mu A/cm^2$ to 2,500 $\mu A/cm^2$, of from 900 $\mu A/cm^2$ to 2,500 $\mu A/cm^2$, of from 1,000 $\mu A/cm^2$ to 2,500 $\mu A/cm^2$, of from 1,100 $\mu A/cm^2$ to 2,500 $\mu A/cm^2$, of from 1,200 $\mu A/cm^2$ to 2,500 $\mu A/cm^2$, of from 1,300 $\mu A/cm^2$ to 2,500 $\mu A/cm^2$, of from 1,400 $\mu A/cm^2$ to 2,500 $\mu A/cm^2$, of from 1,500 $\mu A/cm^2$ to 2,500 $\mu A/cm^2$, of from 1,600 $\mu A/cm^2$ to 2,500 $\mu A/cm^2$, of from 1,700 $\mu A/cm^2$ to 2,500 $\mu A/cm^2$, of from 1,800 $\mu A/cm^2$ to 2,500 $\mu A/cm^2$, of from 1,900 $\mu A/cm^2$ to 2,500 $\mu A/cm^2$, or of from 2000 $\mu A/cm^2$ to 2,500 $\mu A/cm^2$.

In some embodiments, the sodium electrochemical cell of the invention supports a current density at the negative electrode of from 500 $\mu A/cm^2$ to 2,000 $\mu A/cm^2$, of from 600 $\mu A/cm^2$ to 2,000 $\mu A/cm^2$, of from 700 $\mu A/cm^2$ to 2,000 $\mu A/cm^2$, of from 800 $\mu A/cm^2$ to 2,000 $\mu A/cm^2$, of from 900 $\mu A/cm^2$ to 2,000 $\mu A/cm^2$, of from 1,000 $\mu A/cm^2$ to 2,000 $\mu A/cm^2$, of from 1,100 $\mu A/cm^2$ to 2,000 $\mu A/cm^2$, of from 1,200 $\mu A/cm^2$ to 2,000 $\mu A/cm^2$, of from 1,300 $\mu A/cm^2$ to 2,000 $\mu A/cm^2$, of from 1,400 $\mu A/cm^2$ to 2,000 $\mu A/cm^2$, of from 1,500 $\mu A/cm^2$ to 2,000 $\mu A/cm^2$, of from 1,600 $\mu A/cm^2$ to 2,000 $\mu A/cm^2$, of from 1,700 $\mu A/cm^2$ to 2,000 $\mu A/cm^2$, of from 1,800 $\mu A/cm^2$ to 2,000 $\mu A/cm^2$, or of from 1,900 $\mu A/cm^2$ to 2,000 $\mu A/cm^2$.

In some embodiments, the sodium electrochemical cell of the invention supports a current density at the negative electrode of from 500 $\mu A/cm^2$ to 1,500 $\mu A/cm^2$, of from 600 $\mu A/cm^2$ to 1,500 $\mu A/cm^2$, of from 700 $\mu A/cm^2$ to 1,500 $\mu A/cm^2$, of from 800 $\mu A/cm^2$ to 1,500 $\mu A/cm^2$, of from 900 $\mu A/cm^2$ to 1,500 $\mu A/cm^2$, of from 1,000 $\mu A/cm^2$ to 1,500 $\mu A/cm^2$, of from 1,100 $\mu A/cm^2$ to 1,500 $\mu A/cm^2$, of from 1,200 $\mu A/cm^2$ to 1,500 $\mu A/cm^2$, of from 1,300 $\mu A/cm^2$ to 1,500 $\mu A/cm^2$, or of from 1,400 $\mu A/cm^2$ to 1,500 $\mu A/cm^2$.

In some aspects and embodiments, a cell according to the invention has undergone a polarisation cycle. For avoidance of doubt, the expression "a polarisation cycle" will be understood as referring to the initial or first cycle within the cell's lifetime that promotes formation of the SEI layer. By the cell having undergone a "polarisation cycle" is intended to mean the cell has been subjected to a two-step cycle comprising: step 1 in which electric current of a certain density flows through the negative electrode along an initial direction; and step 2 in which the electric current is switched to flow through the negative electrode along the direction opposite to the initial direction.

Provided the polarisation cycle results in (i) the formation of the SEI layer and (ii) a cell supporting a current density at the negative electrode of at least 500 µA/cm$^2$, there is no limitation as to the current density of the polarisation cycle the cell of the invention has undergone.

In some embodiments, the cell according to the invention may be configured and used such that electric current flows through the negative electrode along opposite directions in a cyclical manner. That is, the cell may be subjected to multiple polarisation cycles in which electric current flows through the negative electrode along alternating opposite directions. As a result, an electric potential of alternating sign can be observed.

Cells according to the invention can advantageously undergo multiple polarisation cycles and maintain a current density at the negative electrode of at least 500 µA/cm$^2$. For avoidance of doubt, by the expression "multiple polarisation cycles" is meant at least one polarisation cycle after, and possibly including, the initial of first cycle that promotes formation of the SEI layer. As a skilled person would understand, a cell undergoing polarisation cycles at a certain current density may also be referred to as "sustaining" or being capable of "sustaining" such current density.

In some embodiments, the invention provides a sodium electrochemical cell that supports a current density at the negative electrode of at least 500 µA/cm$^2$ for multiple polarisation cycles, the cell comprising (i) a negative electrode and (ii) a sodium-ion ionic liquid electrolyte having a sodium-ion concentration that is no less than 75% of its saturation limit in the electrolyte, wherein the negative electrode has a solid-electrolyte interphase (SEI) layer formed as a result of the electrochemical cell having undergone a polarisation cycle.

In other embodiments the electrochemical cell supports a current density at the negative electrode of at least 500 µA/cm$^2$ for at least 10 polarisation cycles, or of at least 500 µA/cm$^2$ for at least 20 polarisation cycles, or of at least 500 µA/cm$^2$ for at least 50 polarisation cycles, or of at least 500 µA/cm$^2$ for at least 100 polarisation cycles, or of at least 500 µA/cm$^2$ for at least 500 polarisation cycles, or of at least 500 µA/cm$^2$ for at least 1,000 polarisation cycles.

In some embodiments the sodium electrochemical cell of the invention supports a current density at the negative electrode of at least 750 µA/cm$^2$ for at least 10 polarisation cycles, or of at least 750 µA/cm$^2$ for at least 20 polarisation cycles, or of at least 750 µA/cm$^2$ for at least 50 polarisation cycles, or of at least 750 µA/cm$^2$ for at least 100 polarisation cycles, or of at least 750 µA/cm$^2$ for at least 500 polarisation cycles, or of at least 750 µA/cm$^2$ for at least 1,000 polarisation cycles.

In other embodiments the sodium electrochemical cell of the invention supports a current density at the negative electrode of at least 1,000 µA/cm$^2$ for at least 10 polarisation cycles, or of at least 1,000 µA/cm$^2$ for at least 20 polarisation cycles, or of at least 1,000 µA/cm$^2$ for at least 50 polarisation cycles, or of at least 1,000 µA/cm$^2$ for at least 100 polarisation cycles, or of at least 1,000 µA/cm$^2$ for at least 500 polarisation cycles, or of at least 1,000 µA/cm$^2$ for at least 1,000 polarisation cycles.

In some embodiments the sodium electrochemical cell of the invention supports a current density at the negative electrode of at least 1,500 µA/cm$^2$ for at least 10 polarisation cycles, or of at least 1,500 µA/cm$^2$ for at least 20 polarisation cycles, or of at least 1,500 µA/cm$^2$ for at least 50 polarisation cycles, or of at least 1,500 µA/cm$^2$ for at least 100 polarisation cycles, or of at least 1,500 µA/cm$^2$ for at least 500 polarisation cycles, or of at least 1,500 µA/cm$^2$ for at least 1,000 polarisation cycles.

In other embodiments, when the cell is in use electric current flows through the negative electrode along opposite directions in a cyclical manner as a result of the cell undergoing a charge/discharge cycle. A skilled person will know the technical meaning of the expression "charge/discharge cycle", and how to perform such procedure.

For example, a charge/discharge cycle may be the charge/discharge performed to activate a rechargeable battery following assembly. As a skilled person would know, this refers to the procedure adopted to form/activate a negative electrode by way of charging/discharging routines under controlled voltage, temperature and environmental conditions, which is performed with the intention of inducing formation of the solid-electrolyte interphase (SEI) layer at the negative electrode.

For avoidance of doubt, in the context of the present invention it will be understood that a polarisation cycle is equivalent to a charge/discharge cycle.

Accordingly, the invention also provides a sodium electrochemical cell that supports a current density at the negative electrode of at least 500 µA/cm$^2$, the electrochemical cell comprising (i) a negative electrode, and (ii) a sodium-ion ionic liquid electrolyte having a sodium-ion concentration that is no less than 75% of its saturation limit in the electrolyte, wherein the negative electrode has a solid-electrolyte interphase (SEI) layer formed as a result of the electrochemical cell having undergone a charge/discharge cycle.

In some embodiments, the sodium electrochemical cell of the invention supports a current density at the negative electrode of at least 500 µA/cm$^2$ for at least 10 charge/discharge cycles, or of at least 500 µA/cm$^2$ for at least 20 charge/discharge cycles, or of at least 500 µA/cm$^2$ for at least 50 charge/discharge cycles, or of at least 500 µA/cm$^2$ for at least 100 charge/discharge cycles, or of at least 500 µA/cm$^2$ for at least 500 charge/discharge cycles, or of at least 500 µA/cm$^2$ for at least 1,000 charge/discharge cycles.

In other embodiments, the sodium electrochemical cell of the invention supports a current density at the negative electrode of at least 750 µA/cm$^2$ for at least 10 charge/discharge cycles, or of at least 750 µA/cm$^2$ for at least 20 charge/discharge cycles, or of at least 750 µA/cm$^2$ for at least 50 charge/discharge cycles, or of at least 750 µA/cm$^2$ for at least 100 charge/discharge cycles, or of at least 750 µA/cm$^2$ for at least 500 charge/discharge cycles, or of at least 750 µA/cm$^2$ for at least 1,000 charge/discharge cycles.

In some embodiments, the sodium electrochemical cell of the invention supports a current density at the negative electrode of at least 1,000 µA/cm$^2$ for at least 10 charge/discharge cycles, or of at least 1,000 µA/cm$^2$ for at least 20 charge/discharge cycles, or of at least 1,000 µA/cm$^2$ for at least 50 charge/discharge cycles, or of at least 1,000 µA/cm$^2$ for at least 100 charge/discharge cycles, or of at least 1,000 µA/cm$^2$ for at least 500 charge/discharge cycles, or of at least 1,000 µA/cm$^2$ for at least 1,000 charge/discharge cycles.

In other embodiments, the sodium electrochemical cell of the invention supports a current density at the negative electrode of at least 1,500 µA/cm$^2$ for at least 10 charge/discharge cycles, or of at least 1,500 µA/cm$^2$ for at least 20 charge/discharge cycles, or of at least 1,500 µA/cm$^2$ for at least 50 charge/discharge cycles, or of at least 1,500 µA/cm$^2$ for at least 100 charge/discharge cycles, or of at least 1,500 µA/cm$^2$ for at least 500 charge/discharge cycles, or of at least 1,500 µA/cm$^2$ for at least 1,000 charge/discharge cycles.

Advantageously, the cell according to the invention is capable of operating (for example when discharging while powering an external load attached to it, when charging, etc.) at room temperature. As used herein, the expression "room temperature" will be understood as encompassing a range of temperatures between about 20° C. and about 25° C., with an average of about 23° C.

In some embodiments, the cell according to the invention is capable of operating at temperatures between −20° C. and 150° C., for example between −10° C. and 150° C., between 0° C. and 150° C., between 0° C. and 125° C., between 0° C. and 100° C., between 0° C. and 75° C., between 0° C. and 50° C., or between 0° C. and 25° C.

In some embodiments, the sodium electrochemical cell of the invention comprises a counter electrode. In these embodiments the cell of the invention may be referred to as being in a half-cell configuration.

As used herein, the expression "half-cell configuration" refers to a cell configuration in which the electrodes support a small potential difference (e.g. less than about 1V) during polarisation and from which electrical charge can only be extracted during discharge to a negative cell voltage.

In one embodiment, the invention provides a sodium electrochemical cell that supports a current density at the negative electrode of at least 500 μA/cm$^2$, the electrochemical cell comprising (i) a negative electrode, (ii) a counter electrode and (iii) a sodium-ion ionic liquid electrolyte having a sodium-ion concentration that is no less than 75% of its saturation limit in the electrolyte, wherein the negative electrode has a solid-electrolyte interphase (SEI) layer formed as a result of the electrochemical cell having undergone a polarisation cycle.

As a skilled person would understand, a half-cell configuration includes cells in a 2-electrode, 3-electrode configurations and higher number of electrode configurations. When in a half-cell configuration, the cell of the invention may be suitable for use as a diagnostic or test device. For example, when in a half-cell configuration the cell of the invention can assist with measuring the electrochemical characteristics of the electrolyte, or with identifying suitable positive electrodes for use in a full cell configuration according to the invention.

In some embodiments, the sodium electrochemical cell of the invention comprises a positive electrode. In these embodiments the cell may be referred to as being in a full-cell configuration. As used herein, the expression "full-cell configuration" refers to a cell configuration in which the positive and negative electrode support a substantial potential difference (e.g. greater than about 0.1V) after charging and from which electrical charge can be extracted during discharge at a positive cell voltage.

In one embodiment, the invention provides a sodium electrochemical cell that supports a current density at the negative electrode of at least 500 μA/cm$^2$, the electrochemical cell comprising (i) a negative electrode, (ii) a positive electrode and (iii) a sodium-ion ionic liquid electrolyte having a sodium-ion concentration that is no less than 75% of its saturation limit in the electrolyte, wherein the negative electrode has a solid-electrolyte interphase (SEI) layer formed as a result of the electrochemical cell having undergone a polarisation cycle.

As used herein, and as a person skilled in the art would know, the expression "positive electrode" refers to the electrode at which electrons enter the cell during discharge. By reference to its functionality during discharge, the positive electrode is also commonly referred to in the art as a "cathode".

Suitable positive electrodes for use in a cell according to the invention are not particularly limited, provided that the resulting cell supports a current density at the negative electrode of at least 500 μA/cm$^2$.

A positive electrode may comprise (or be made of) material that can reversibly intercalate sodium ions within their atomic structure, absorb/desorb sodium ions by reversible oxidation/reduction reactions, or promote alloying/dealloying reactions with sodium as described herein.

The expressions "positive electrode may comprise" and "positive electrode may be made of" are intended to be a reference the composition of the positive electrode per se, absent electrolyte material.

Examples of material which the positive electrode may comprise (or be made of) $Na_{0.45}Ni_{0.22}Co_{0.11}Mn_{0.66}O_2$, $Na_{2/3}Fe_{2/3}Mn_{1/3}O_2$ (O3), $Na_{2/3}Fe_{2/3}Mn_{1/3}O_2$ (P2), olivine-type $NaFePO_4$, $Na_xFePO_4$, Silicates, Nasicon type phases of general formula $Na_2M_2(XO_4)_3$ (M=transition metal and X=P, S), and capacitors such as a carbon capacitor.

In some embodiments, the positive electrode is a capacitor, for example a carbon capacitor. The carbon electrode used in the electrochemical cell as a positive capacitor electrode is prepared as a composite material by a casting and blading method, of the kind typically used for preparing thin solid film electrodes. The carbon composite positive electrode is subjected to a charging current substantially equal and opposite to the sodium negative electrode charging current to the specified voltage limit.

A sodium electrochemical cell of the invention, when in a full-cell configuration, may also support a current density at the negative electrode having values described herein.

A sodium electrochemical cell of the invention, when in a full-cell configuration and undergoing polarisation or charge/discharge cycles as described herein, may also support a current density at the negative electrode having values described herein.

When the positive electrode is a carbon capacitor, there is also provided a sodium electrochemical cell comprising a negative electrode, a positive electrode in the form of a capacitor and a sodium-ion ionic liquid electrolyte, wherein the sodium-ion concentration in the electrolyte is no less than 75% of its saturation limit in the electrolyte.

In some embodiments, the negative electrode comprises sodium. In other embodiments, the negative electrode comprises sodium metal. In yet other embodiments, the negative electrode consists essentially of sodium metal. In some embodiments, the sodium metal is in solid state. In other embodiments, the negative electrode comprises carbon and sodium.

In some embodiments, the negative electrode comprises a sodium/carbon composite as described herein.

A full-cell configuration the cell of the invention can advantageously find application as an energy storage device, for example as a sodium rechargeable battery. The specific current density that the cell of the invention is supports advantageously provides for a sodium rechargeable battery having high discharge capacity and supporting high current charge-discharge rates.

Accordingly, the present invention also provides a sodium rechargeable battery that supports a current density at the negative electrode of at least 500 μA/cm$^2$, the battery comprising (i) a negative electrode, (ii) a positive electrode and (iii) a sodium-ion ionic liquid electrolyte having a sodium-ion concentration that is no less than 75% of its saturation limit in the electrolyte, wherein the negative electrode has a solid-electrolyte interphase (SEI) layer formed as a result of the electrochemical cell having undergone a polarisation cycle.

A sodium electrochemical cell comprising a combination of a negative electrode, a positive electrode in the form of a capacitor, for example a carbon capacitor, and a sodium-ion ionic liquid electrolyte is believed to be unique in its own right. Accordingly, the invention also provides a sodium electrochemical cell comprising a negative electrode, a positive electrode in the form of a capacitor and a sodium-ion ionic liquid electrolyte. For convenience, this cell will be herein referred to as a "hybrid cell". In the hybrid cell the chemical nature of the sodium-ion ionic liquid electrolyte is of the kind described herein. However, the electrolyte may have a concentration of sodium-ion of 1 mol %, 10 mol %, 20 mol %, 30 mol %, 40 mol %, 50 mol %, 60 mol %, 70 mol %, 80 mol %, or 90 mol %. For example, the concentration of sodium-ion may be between 1 mol % and 90 mol %, between 10 mol % and 90 mol %. between 10 mol % and 80 mol % , between 10 mol % and 70 mol %, between 10 mol % and 60 mol %, between 10 mol % and 50 mol %, between 10 mol % and 40 mol %, between 10 mol % and 30 mol %, or between 10 mol % and 20 mol %. The hybrid cell may also be capable of supporting a current density at the negative electrode of at least 1 $\mu A/cm^2$, at least 5 $\mu A/cm^2$, at least 10 $\mu A/cm^2$, at least 25 $\mu A/cm^2$, at least 50 $\mu A/cm^2$, at least 75 $\mu A/cm^2$, at least 100 $\mu A/cm^2$, at least 200 $\mu A/cm^2$, at least 300 $\mu A/cm^2$, at least 400 $\mu A/cm^2$, at least 500 $\mu A/cm^2$, at least 600 $\mu A/cm^2$, at least 700 $\mu A/cm^2$, at least 800 $\mu A/cm^2$, or at least 900 $\mu A/cm^2$, at least 1,000 $\mu A/cm^2$, at least 1,500 $\mu A/cm^2$, at least 2,000 $\mu A/cm^2$. In this aspect, the sodium electrochemical cell of the invention is capable of supporting a current density at the negative electrode of up to 2,500 $\mu A/cm^2$. The negative electrode of the hybrid cell may be a negative electrode of the kind described herein. For example, the sodium electrode may comprise sodium, or may be a sodium/carbon composite as described herein.

The present invention also provides a method of manufacturing a sodium electrochemical cell which (i) comprises a negative electrode and a sodium-ion ionic liquid electrolyte having a sodium-ion concentration that is no less than 75% of its saturation limit in the electrolyte, and (ii) supports a current density at the negative electrode of at least 500 $\mu A/cm^2$, the method comprising bringing into contact with the negative electrode the sodium-ion ionic liquid electrolyte, and performing a polarisation cycle of the cell so as to form at the negative electrode a solid-electrolyte interphase (SEI) layer.

Known methods and equipment for manufacturing electrochemical cells can advantageously be used for manufacturing cells according to the present invention.

As used herein, the expression "bringing into contact" is meant to embrace all available techniques that allow placing the negative electrode and the electrolyte in electrical contact.

In some embodiments, the cell in the method of the invention comprises a positive electrode as described herein. Accordingly, the invention also provides a method of manufacturing a sodium electrochemical cell which (i) comprises a negative electrode, a positive electrode and a sodium-ion ionic liquid electrolyte having a sodium-ion concentration that is no less than 75% of its saturation limit in the electrolyte, and (ii) supports a current density at the negative electrode of at least 500 $\mu A/cm^2$, the method comprising bringing into contact with the negative and positive electrode the sodium-ion ionic liquid electrolyte, and performing a polarisation cycle of the cell so as to form at the negative electrode a solid-electrolyte interphase (SEI) layer.

Specific embodiments of the invention will now be described with reference to the following non-limiting examples.

EXAMPLES

Na[FSI]/[C$_3$mpyr][FSI] Electrolyte

Na[FSI] (99.9%) and [C$_3$mpyr][FSI] (99%) were obtained from Solvionics™ and used without further purification. Different concentration samples were prepared by dissolution of the salt in the ionic liquid at 50° C. The moisture contents were less than 20 ppm for pure ionic liquid and mixed electrolytes. All materials handling and cell preparations we undertaken in an Argon filled drybox or in a cell sealed under Argon prior to removal from the drybox for testing.

3-electrode Cell for Cyclic Voltammetry

Figure 2:
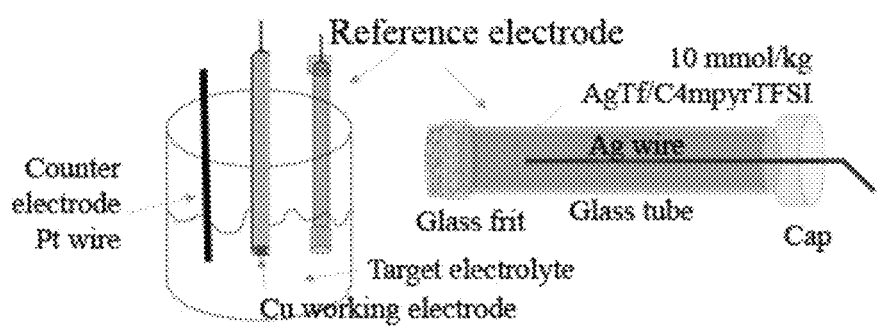
FIG. 2 is a schematic view of an embodiment cell in a 3-electrode configuration used to test the electrolytes.

Cyclic Voltammetry was performed with 1.5 mm diameter Cu planar disc working electrode and a Pt wire counter electrode and a reference electrode comprised of a silver wire immersed in a solution of 10 mM AgNTf$_2$ (99.95% Solvionic™) in C$_4$mpyr[TFSI], as described in FIG. 2. A platinum pseudo-reference was used for some experiments.

Cyclic volatammetry was performed with a scan rate of 20 mV/s with potentiostatic control provided by Biologic SP-200™ controlled with EC-Lab (ver. 10.38) software.

Na|Na Electrochemical Cell

A sodium metal rod (Sigma-Aldrich™) immersed in Paraffin oil was mechanically pressed to form a plate having approximately 100 μm thickness and cleaned with n-Hexane. 1.2 cm diameter discs were then cut from the plate. 2 discs were used to make a 2032 type coin symmetrical cell with a 30μm thickness glass filter separator as described in the FIG. 1.

Polarisation was done with Neware battery tester BTS-3000TH for 10 $\mu A/cm^2$ 20 cycles, 50 $\mu A/cm^2$ 20 cycles, 100 $\mu A/cm^2$ 20 cycles, 500 $\mu A/cm^2$ 20 cycles, 1000 $\mu A/cm^2$ 20 cycles and finally 10 $\mu A/cm^2$ 20 cycles.

Na|Sodium/carbon Composite Negative Electrode Electrochemical Cell

A carbon electrode foil was coated on aluminum foil with (90% YP50 carbon (Kuraray Chemical Co. Ltd USA), 10% PVDF binder, using NMP as a casting medium). This foil was cut into 1.2 cm diameter disc and used for an anode. The counter sodium metal plate electrode was used as described sodium symmetrical cell. This cell was first discharged to 0.1V with 16 $\mu A/cm^2$ and charged to 1V with the same current and this cycle was repeated for 10 times, and the rate performance was measured with 16 $\mu A/cm^2$, 80 $\mu A/cm^2$ and 160 $\mu A/cm^2$.

Na|Carbon Capacitor Positive Electrode Cell

The cell was prepared with an identical procedure to the Na|Sodium/carbon composite negative electrode cell. In this case the cell is charged first to 4V followed by discharge to 2.5V, the applied current density at the negative electrode was 500 $\mu A/cm^2$.

Na|Metal Oxide or Phosphate Positive Electrode Cell

The cell was prepared with the analogous procedure to the Na|Sodium/carbon composite negative electrode cell, where the various layered oxide or iron phosphate active materials (80 wt %) were coated onto an aluminum foil using a PVDF binder (10 wt %—Solvay) and C65 conductive carbon additive (10 wt %—TimCal). In these cases the cell is charged first to an upper voltage of 4V followed by discharge to 1.75V, the applied current density at the negative electrode was varied dependent upon the active material type and loading.

Example 1

Figure 3:
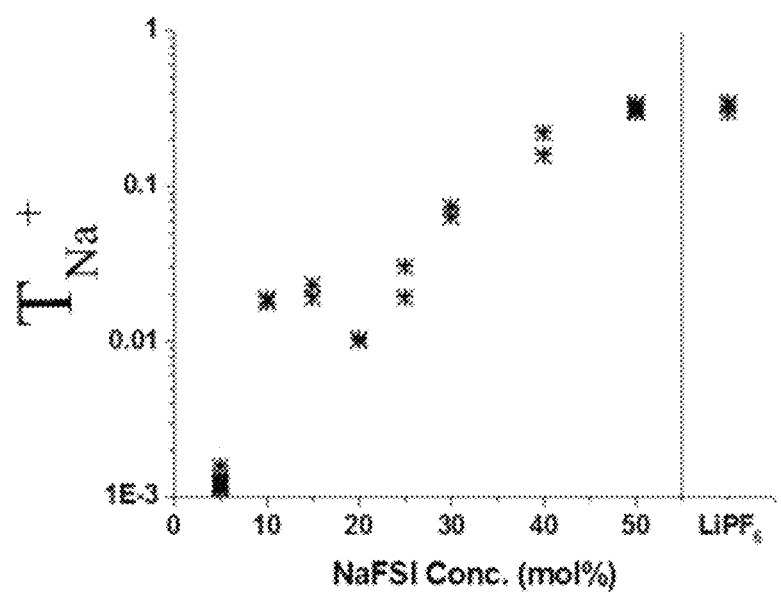
FIG. 3 shows a comparison of the sodium-ion transference numbers determined for Na[FSI]/[C$_3$mpyr][FSI] electrolytes with a range of concentrations of sodium-ion.

The fraction of charge carried by the sodium-ion in the electrolyte, as indicated by the sodium-ion transference number is represented in FIG. 3 for a range of concentrations. The test was performed using a Na|Na electrochemical cell comprising two Na metal electrodes according to the method described in P. G. Bruce, C. A. Vincent, *Journal of Electroanalytical Chemistry and Interfacial Electrochemistry* (1987), volume 225, pages 1-17, the content of which is included herein in its entirety. The relative contribution of the sodium-ion to charge transport within the electrolyte is observed to increase with increasing sodium-ion concentration.

Example 2

Figure 4:
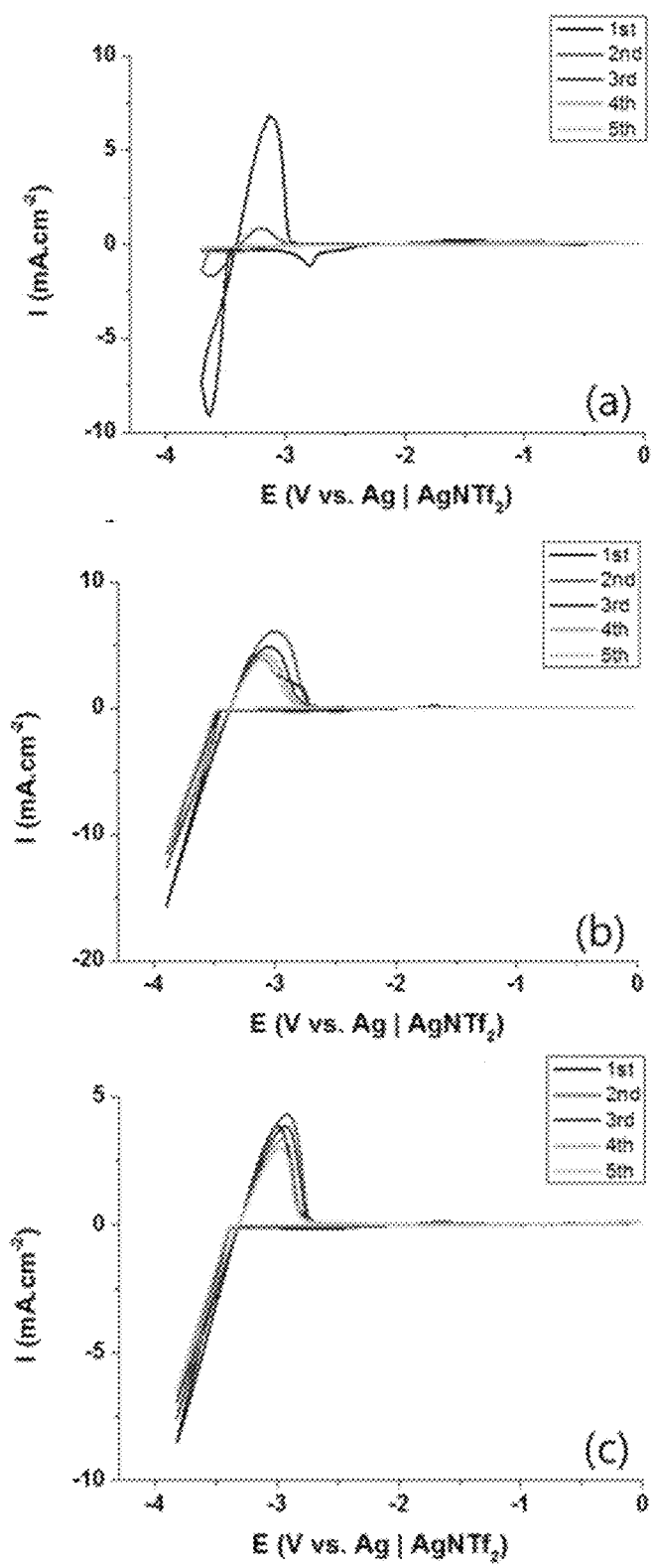
FIG. 4 shows successive cyclic voltammograms (5 cycles) measured on a cell of the kind shown in FIG. 2 using a Na[FSI]/[C$_3$mpyr][FSI] electrolyte with increasing sodium-ion concentration: (a) 15 mol %, (b) 40 mol % and (c) 50 mol %.

The electrochemical stability and performance of a sodium electrode deposited on a Cu substrate is determined by successive cyclic voltammetry experiments (5 cycles), using 3-electrode cells of the kind described herein and obtained using a Na[FSI]/[C$_3$mpyr][FSI] electrolyte with different sodium-ion concentrations. The test was conducted at 20 mV/s and at room temperature. The results of the test are illustrated in FIG. 4.

Effective deposition and dissolution of sodium is observed, with no indication of degradation to the electrolyte. The cell with the highest concentration of sodium-ion in the electrolyte (50 mol %) is observed to support stable cycling currents with negligible decay compared to the other compositions.

Example 3

The electrochemical stability and performance of a sodium electrode deposited on a Cu substrate is determined by cyclic voltammetry (5 cycles), using a 3-electrode cell as described herein and [NaFSI]/[N$_{2(2O2O1)3}$][TFSI] electrolyte with a sodium-ion concentration of 63 mol %.

Figure 5:
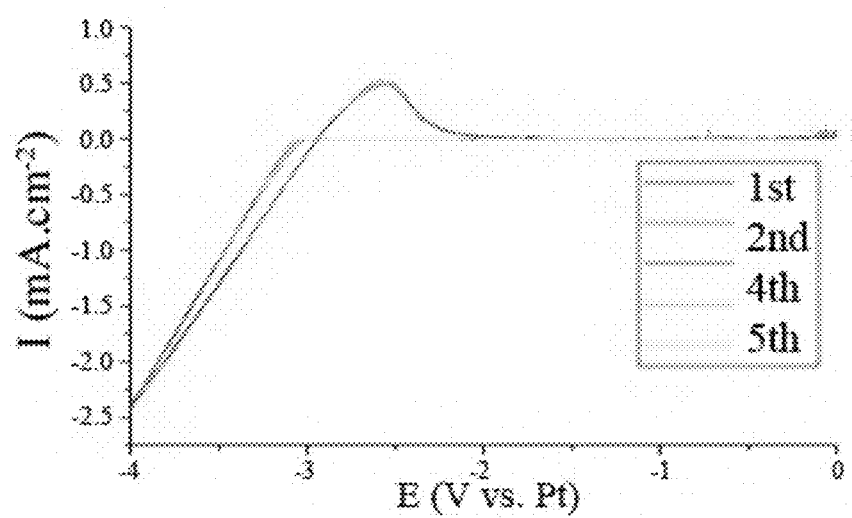
FIG. 5 shows successive cyclic voltammograms (5 cycles) measured on a cell of the kind shown in FIG. 2 using a Na[FSI]/[N$_{2(2O2O1)3}$][TFSI] electrolyte having a sodium-ion concentration of 63 mol % at 75° C.

The test was conducted at 20 mV/s at 75° C. The results of the test are illustrated in FIG. 5. During the test effective deposition and dissolution of sodium was observed, with no indication of degradation to the electrolyte. The test shows that at elevated temperature such as 75° C. the cell is observed to support stable cycling currents with negligible decay.

Example 4

The electrochemical stability and performance of a sodium electrode deposited on a Cu substrate is determined by successive cyclic voltammetry experiments (5 cycles) using 3-electrode cells of the kind described herein obtained using a Na[TFSI]/[N$_{2(2O2O1)3}$][TFSI] electrolyte with different sodium-ion concentrations.

Figure 6:
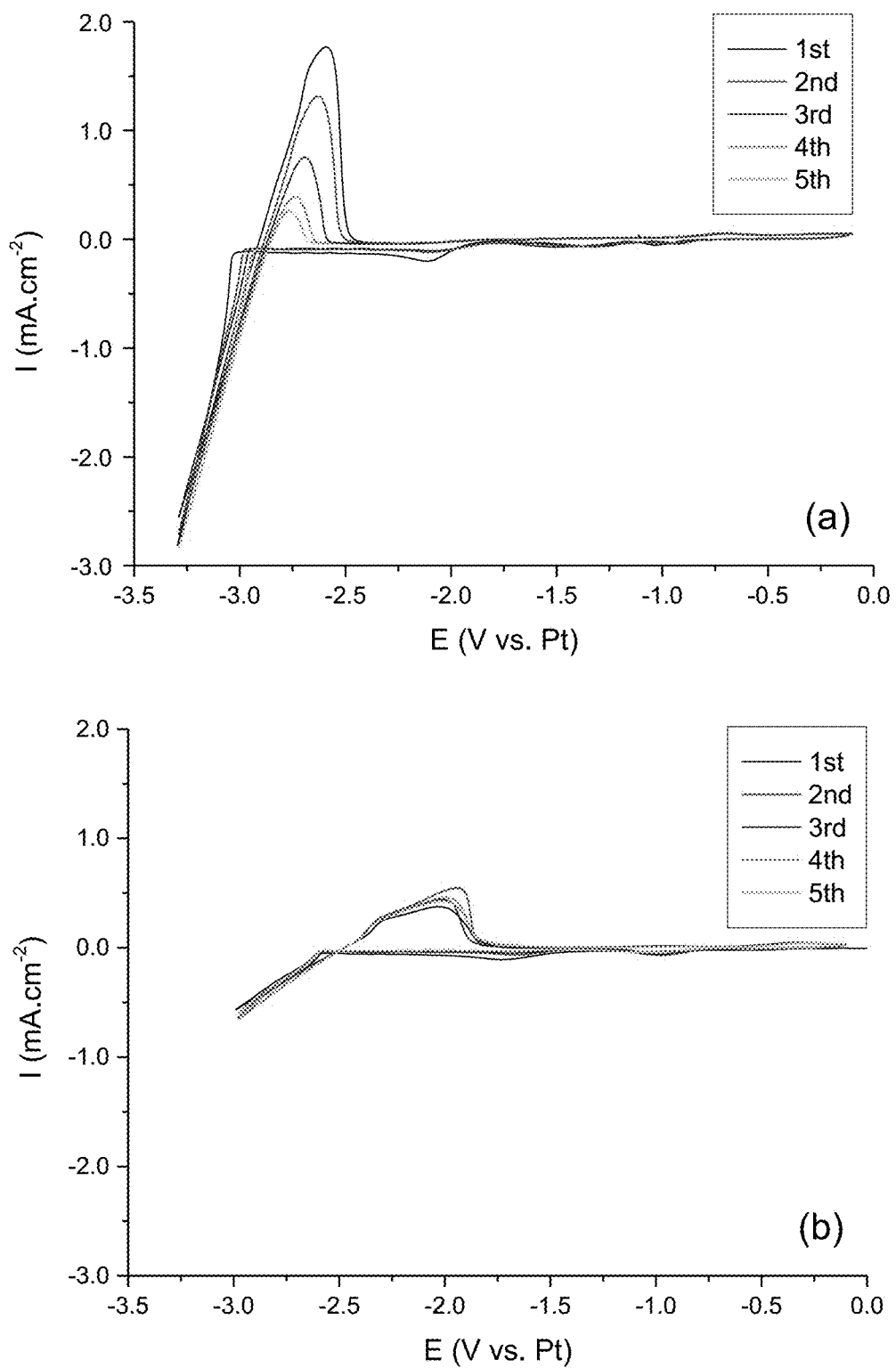
FIG. 6 shows successive cyclic voltammograms (5 cycles) measured at 50° C. on a cell of the kind shown in FIG. 2 and using a Na[TFSI]/[N$_{2(2O2O1)3}$][TFSI] electrolyte with increasing sodium-ion concentration: (a) 38 mol %, (b) 56 mol %.

The test was conducted at 20 mV/s and at room temperature. The results of the test are illustrated in FIG. 6. Effective deposition and dissolution of sodium is observed, with no indication of degradation to the electrolyte. The cell with the highest concentration of sodium-ion in the electrolyte (56 mol %) is observed to support stable cycling currents with negligible decay compared to the cell using the electrolyte with lower sodium-ion concentration (38 mol %).

Example 5

Figure 7:
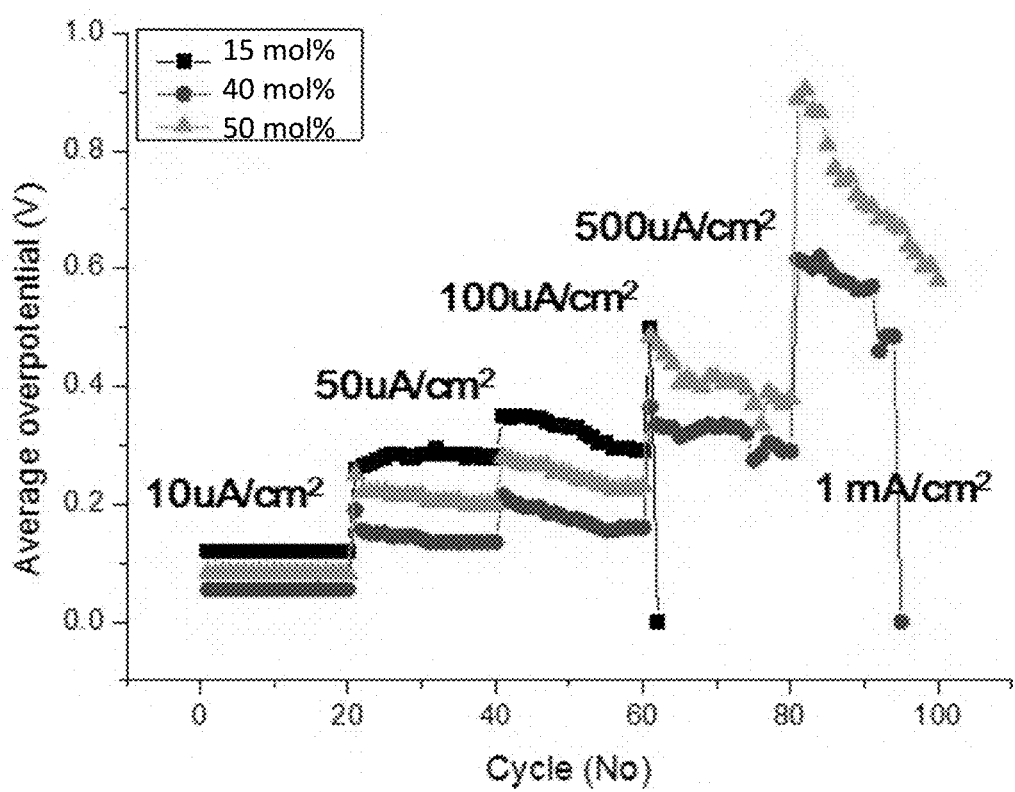
FIG. 7 shows the average cell overpotentials recorded during galvanostatic cycling of a cell of the kind shown in FIG. 1 using a Na[FSI]/[C$_3$mpyr][FSI] electrolyte with different sodium-ion concentrations, at a range of applied current densities and at room temperature.

Sodium electrochemical cells of the kind shown in FIG. 1 and obtained using a Na[FSI]/[C$_3$mpyr][FSI] electrolyte with increasing sodium-ion concentration were subjected to repeated galvanostatic cycles at increasing current densities, as shown in FIG. 7. The cell having the electrolyte with the highest concentration of sodium-ion (50 mol %) is observed to support higher current densities of up to 1,000 µA/cm$^2$ without failure due to short-circuit or electrolyte decomposition.

Example 6

Figure 8:
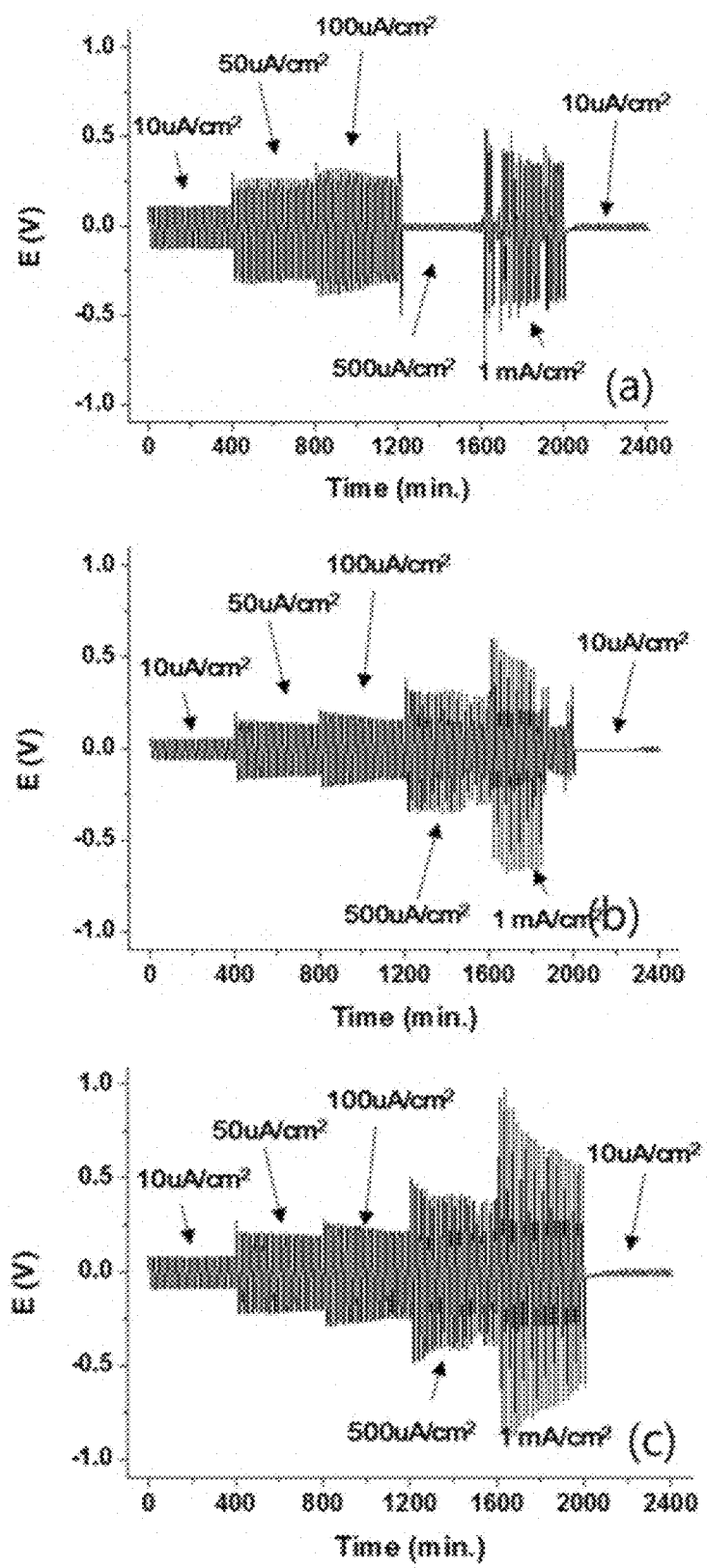
FIG. 8 shows cell potential profiles obtained during the galvanostatic cycling of a cell of the kind shown in FIG. 1 at a range of applied current densities, at room temperature, and using a Na[FSI]/[C$_3$mpyr][FSI] electrolyte with increasing sodium-ion concentrations: (a) 15 mol %, (b) 40 mol %, and (c) 50 mol %.

The potential profile of the sodium ion electrochemical cells described Example 5 is shown in FIG. 8. The cells using a Na[FSI]/[C$_3$mpyr][FSI] electrolyte with the highest sodium-ion concentration, i.e. 50 mol % exhibit lower stable potentials and the ability to reliably support higher current densities without indication of cell failure (as indicated by erratic and changeable voltage response). Onset of failure is apparent at 500 µA/cm$^2$ for the cells having an electrolyte with a sodium-ion concentration of 15 mol % and 40 mol %. In contrast, onset of failure is absent for the cell having an electrolyte with a sodium-ion concentration of 50 mol %.

Example 7

Figure 9:
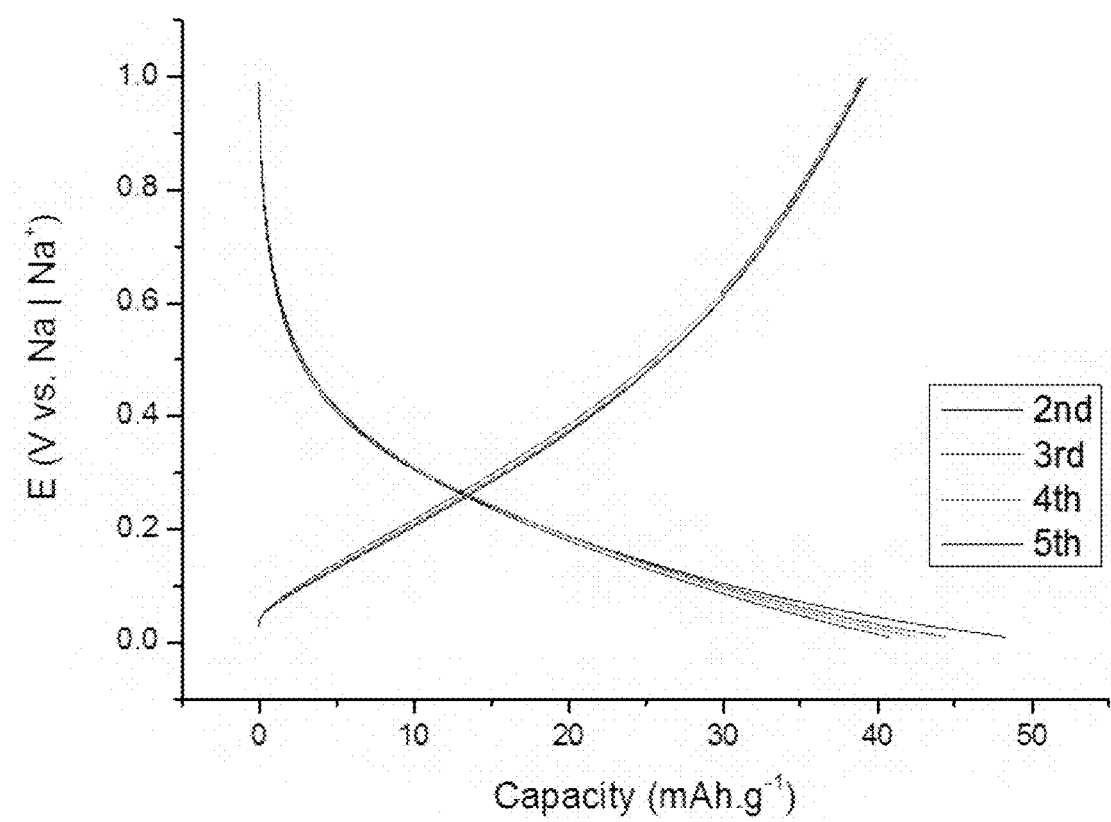
FIG. 9 shows successive charge and discharge voltage profiles recorded during cycling (5 cycles) of an embodiment cell comprising a sodium/carbon composite negative electrode and a Na[FSI]/[C$_3$mpyr][FSI] electrolyte with a sodium-ion concentration of 50 mol % at 16 $\mu A/cm^2$ at room temperature.

The cycling performance (5 cycles) of cells using a Na[FSI]/[C$_3$mpyr][FSI] electrolyte with increasing concentrations of sodium-ion according to embodiments of the invention is shown in FIG. 9. The cells are shown to sustainably undergo charge/discharge cycles using a sodium/carbon composite negative electrode.

Example 8

Figure 10:
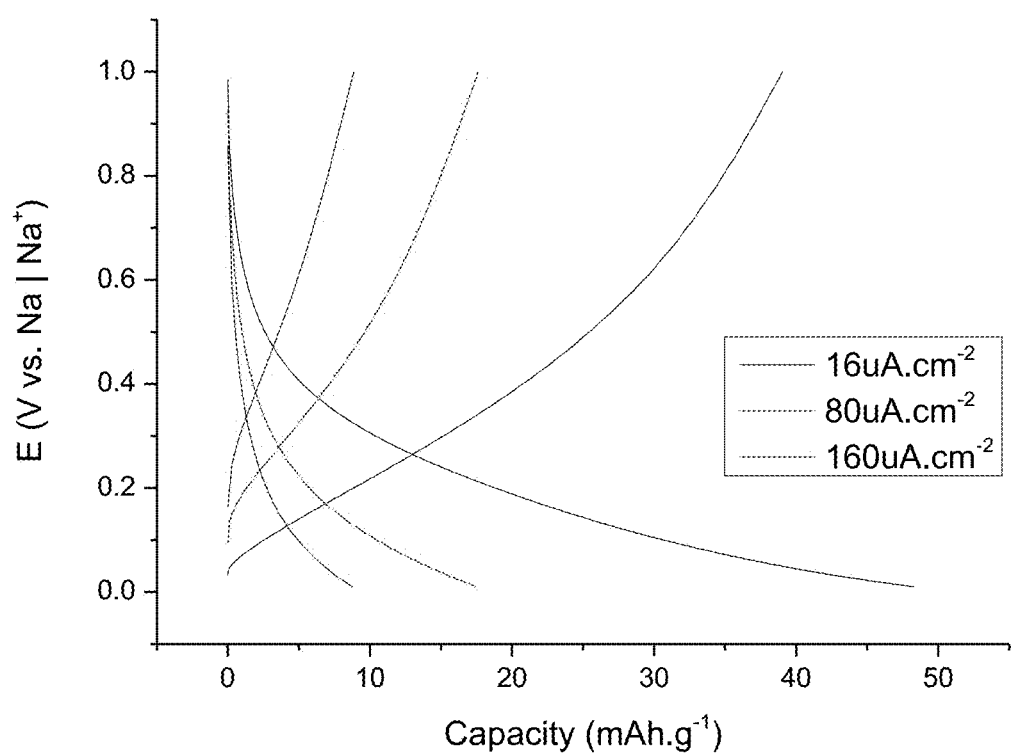
FIG. 10 shows charge and discharge capacities recorded during cycling of an embodiment cell comprising a sodium/carbon composite negative electrode and a Na[FSI]/[C$_3$mpyr][FSI] electrolyte with a sodium-ion concentration of 50 mol %. The test was performed at a range of current densities and at room temperature.

The cycling performance of a sodium electrochemical cell comprising a sodium/carbon composite negative electrode is shown in FIG. 10. The cell is shown to sustainably undergo charge/discharge cycling using the carbon composite negative electrode at a range of current densities.

Example 9

Figure 11:
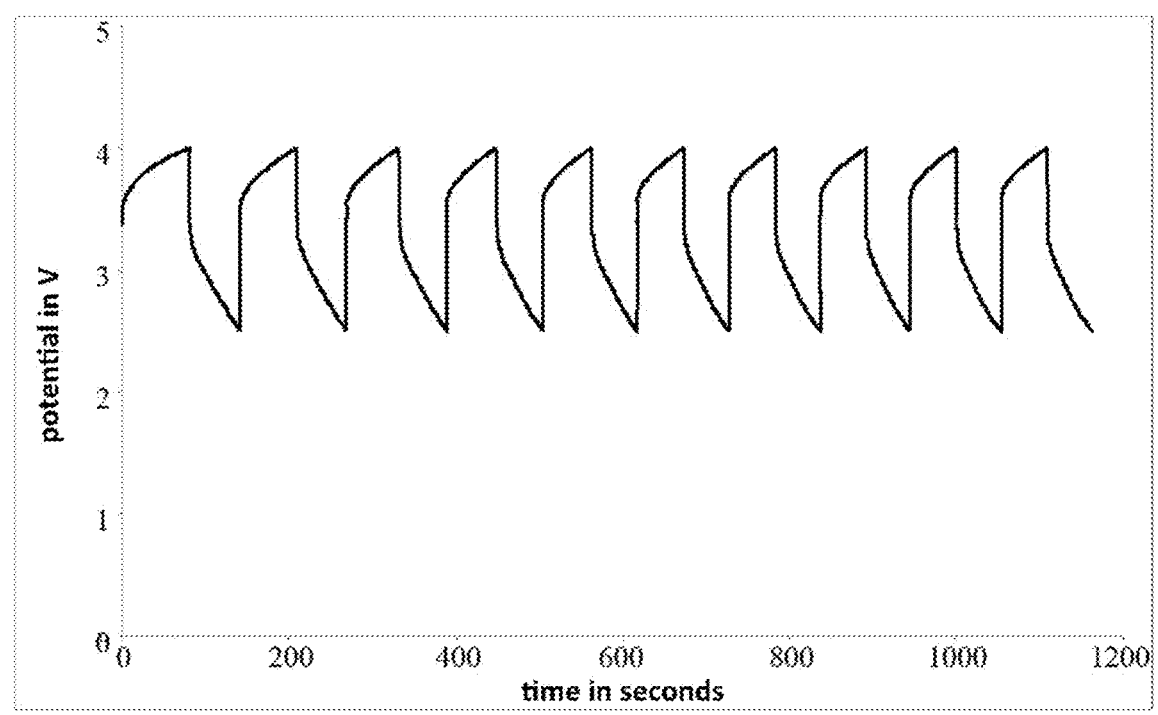
FIG. 11 shows successive charge and discharge voltage profiles recorded at room temperature during cycling of an embodiment cell comprising a positive electrode in the form of a carbon capacitor and a Na[FSI]/[C3mpyr][FSI] electrolyte with a sodium-ion concentration of 50 mol %.

The cycling performance of a sodium electrochemical cell comprising a carbon capacitor positive electrode is shown in FIG. 11. The potential profile of the cell is shown to sustainably undergo charge/discharge cycling. The plot in FIG. 11 shows successive charge and discharge voltage profiles recorded at room temperature during cycling of the cell. The cell was obtained using a Na[FSI]/[C$_3$mpyr][FSI] electrolyte with a sodium-ion concentration of 50 mol %. The plot evidences a remarkable cell stability and fast switching during charge/discharge cycles repeated up to 1200 seconds.

Example 10

Figure 12:
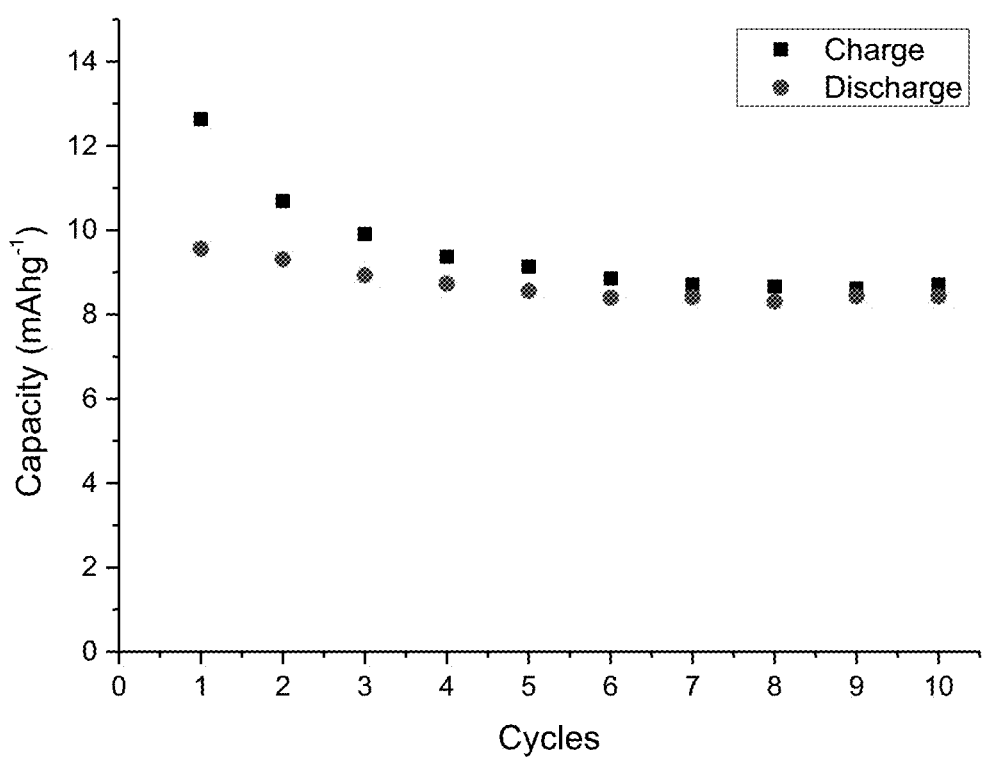
FIG. 12 shows successive charge and discharge capacities recorded during cycling of an embodiment cell comprising a positive electrode in the form of a carbon capacitor and a Na[FSI]/[C3mpyr][FSI] electrolyte with a sodium-ion concentration of 50 mol %. The test was performed at 500 $\mu A/cm^2$ and at room temperature.

The cycling performance of sodium electrochemical cells comprising a carbon capacitor positive electrode and a Na[FSI]/[C$_3$mpyr][FSI] electrolyte with increasing concentration of sodium-ion is shown in FIG. 12. The cell is shown to maintain a stable charge/discharge capacity while cycling.

The cell was obtained using a sodium-ion concentration in the electrolyte of 50 mol %. The test was performed at 500 µA/cm² and at room temperature.

Example 11

Figure 13:
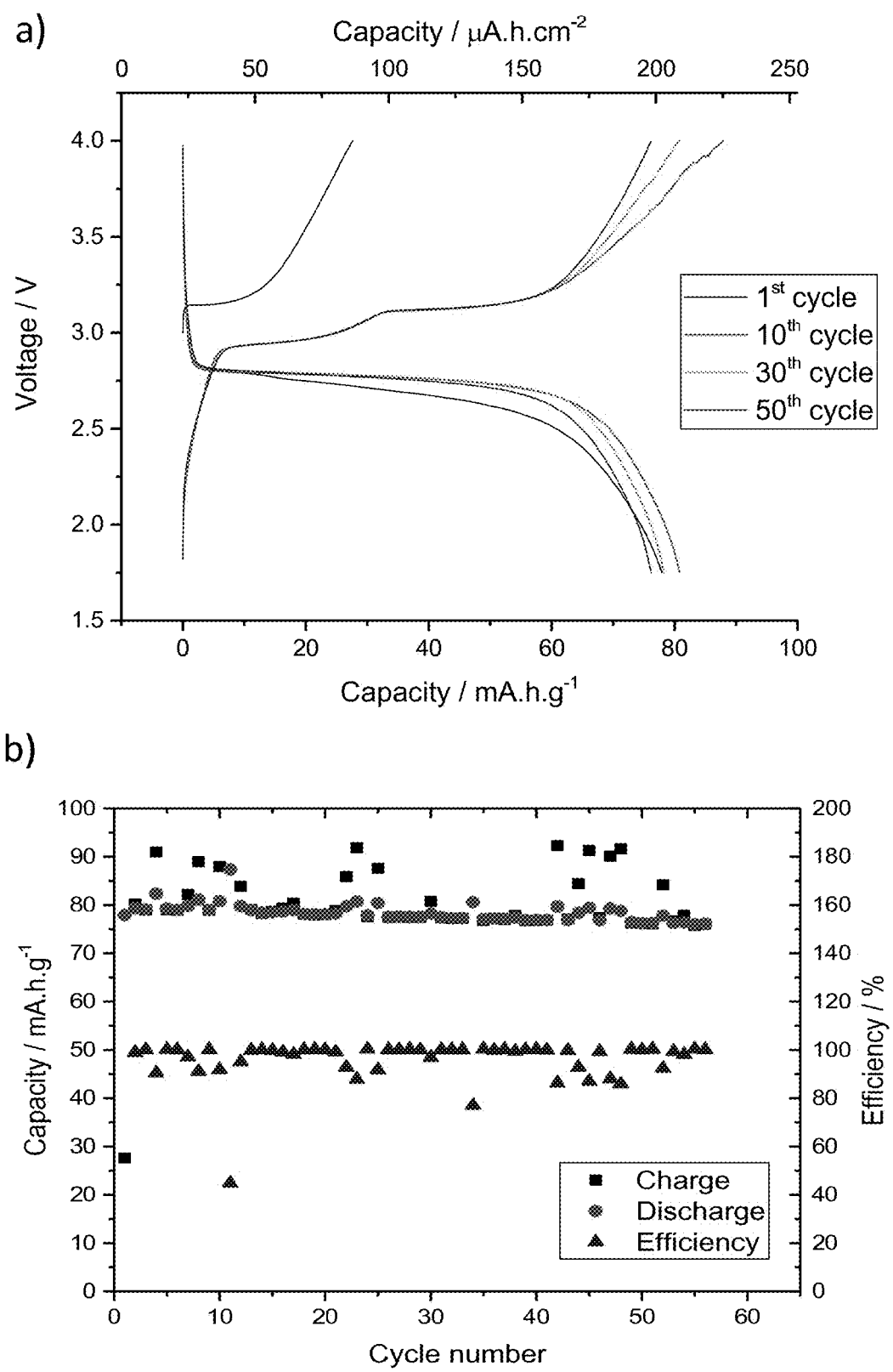
FIG. 13 shows successive charge and discharge capacities recorded during cycling of an embodiment cell comprising a Na$_x$FePO4 positive electrode and a [NaFSI]/[P$_{111i4}$][FSI] electrolyte with a sodium-ion concentration of 50 mol %: (a) voltage (V) vs. capacity (mA·h·g$^{-1}$ and $\mu$A·h·cm$^{-2}$), and (b) maximum capacity (mA·h·g$^{-1}$) and efficiency (%) vs. cycle number.

The cycling performance of sodium electrochemical cells comprising a sodium negative electrode, a $Na_xFePO_4$ positive electrode and a [NaFSI]/[$P_{111i4}$][FSI] electrolyte is shown in FIG. 13. The sodium-ion concentration in the electrolyte is 50 mol %. The data allows appreciating the increase in cell charge capacity as a result of the formation of the SEI layer after the first cycle. The cell is also shown to maintain a stable charge/discharge capacity while cycling between 1.75V and 4V. The cell was obtained using a sodium-ion concentration in the electrolyte of 50 mol % and positive material active mass of 2.4 mg. The test was performed at 76 µA/cm² (C/5) and at 50° C.

Example 12

Figure 14:
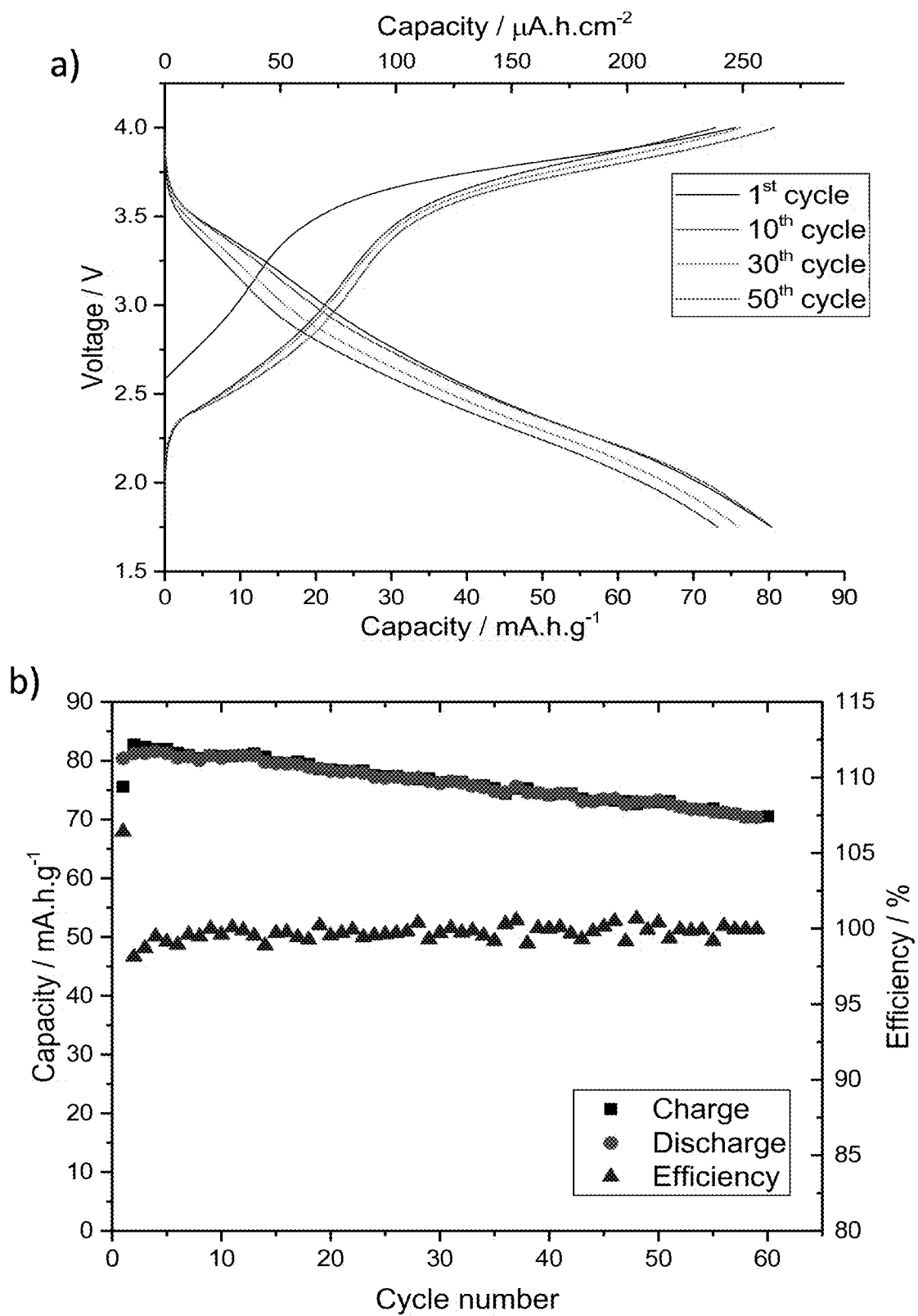
FIG. 14 shows successive charge and discharge capacities recorded during cycling of an embodiment cell comprising a Na$_{2/3}$Fe$_{2/3}$Mn$_{1/3}$O$_2$ (O3) positive electrode and a [NaFSI]/[P$_{111i4}$][FSI] electrolyte with a sodium-ion concentration of 50 mol %: (a) voltage (V) vs. capacity (mA·h·g$^{-1}$ and $\mu$A·h·cm$^{-2}$), and (b) maximum capacity (mA·h·g$^{-1}$) and efficiency (%) vs. cycle number.

The cycling performance of sodium electrochemical cells comprising a sodium negative electrode, a $Na_{2/3}Fe_{2/3}Mn_{1/3}O_2$ (O3) positive electrode and a [NaFSI]/[$P_{111i4}$][FSI] electrolyte is shown in FIG. 14. The data allows appreciating the increase in cell charge capacity as a result of the formation of the SEI layer after the first cycle. The cell is also shown to maintain a stable charge/discharge capacity while cycling. The cell was obtained using a sodium-ion concentration in the electrolyte of 50 mol % and positive material active mass of 3.1 mg. The test was performed at 98 µA/cm² (C/5) and at 50° C., during which the cell was cycled between 1.75V and 4V.

Example 13

Figure 15:
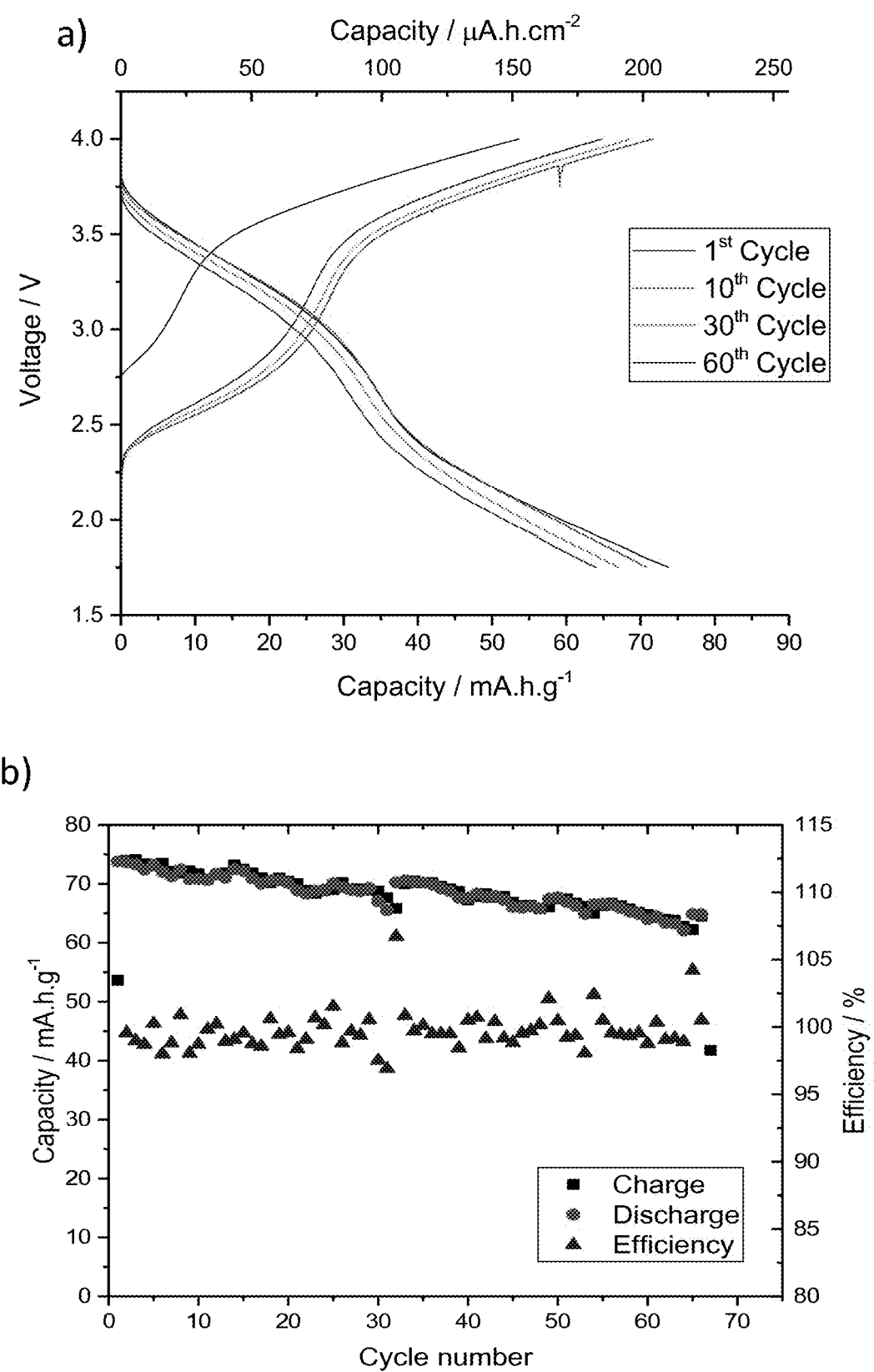
FIG. 15 shows successive charge and discharge capacities recorded during cycling of an embodiment cell comprising a Na$_{2/3}$Fe$_{2/3}$Mn$_{1/3}$O$_2$ (P2) positive electrode and a [NaFSI]/[P$_{111i4}$][FSI] electrolyte with a sodium-ion concentration of 50 mol %: (a) voltage (V) vs. capacity (mA·h·g$^{-1}$ and $\mu$A·h·cm$^{-2}$), and (b) maximum capacity (mA·h·g$^{-1}$) and efficiency (%) vs. cycle number.

The cycling performance of sodium electrochemical cells comprising a sodium negative electrode, a $Na_{2/3}Fe_{2/3}Mn_{1/3}O_2$ (P2) positive electrode and a [NaFSI]/[$P_{111i4}$][FSI] electrolyte is shown in FIG. 15. The data allows appreciating the increase in cell charge capacity as a result of the formation of the SEI layer after the first cycle. The cell is also shown to maintain a stable charge/discharge capacity while cycling. The cell was obtained using a sodium-ion concentration in the electrolyte of 50 mol % and positive material active mass of 2.7 mg. The test was performed at 85 µA/cm² (C/5) and at 50° C., during which the cell was cycled between 1.75V and 4V.

Example 14

Figure 16:
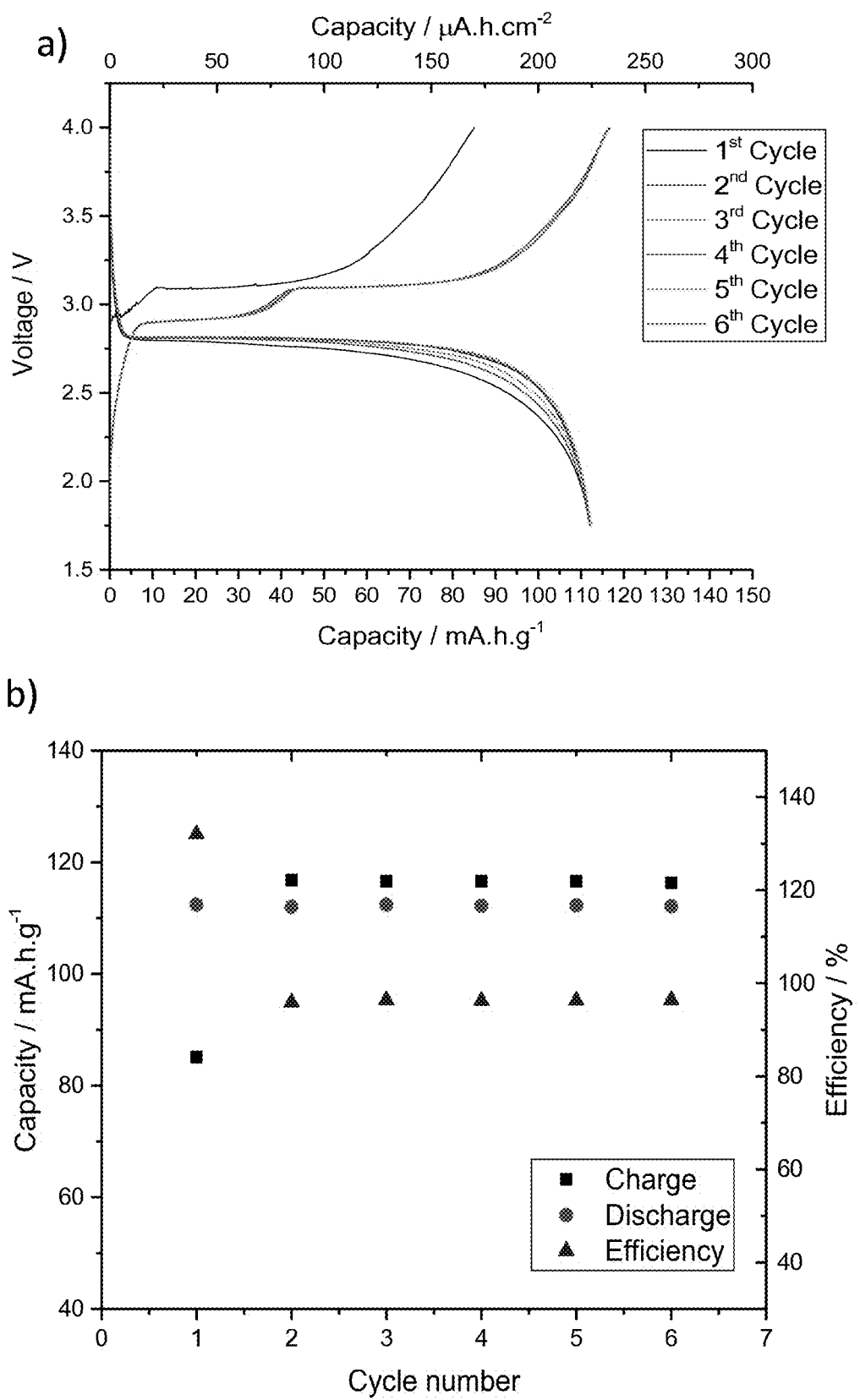
FIG. 16 shows successive charge and discharge capacities recorded during cycling of an embodiment cell comprising a Na$_{2/3}$Fe$_{2/3}$Mn$_{1/3}$O$_2$ (P2) positive electrode and a [NaFSI]/[N$_{2(2O2O1)3}$][FSI] electrolyte with a sodium-ion concentration of 50 mol %: (a) voltage (V) vs. capacity (mA·h·g$^{-1}$ and μA·h·cm$^{-2}$), and (b) maximum capacity (mA·h·g$^{-1}$) and efficiency (%) vs. cycle number.

The cycling performance of sodium electrochemical cells comprising a sodium negative electrode, a $Na_{2/3}Fe_{2/3}Mn_{1/3}O_2$ (P2) positive electrode and a [NaFSI]/[$N_{2(2O2O1)3}$][FSI] electrolyte is shown in FIG. 16. The data allows appreciating the increase in cell charge capacity as a result of the formation of the SEI layer after the first cycle. The cell is also shown to maintain a stable charge/discharge capacity while cycling. The cell was obtained using a sodium-ion concentration in the electrolyte of 50 mol % and positive material active mass of 1.9 mg. The test was performed at 60 µA/cm² (C/5) and at 50° C., during which the cell was cycled between 1.75V and 4V.

Example 15

Figure 17:
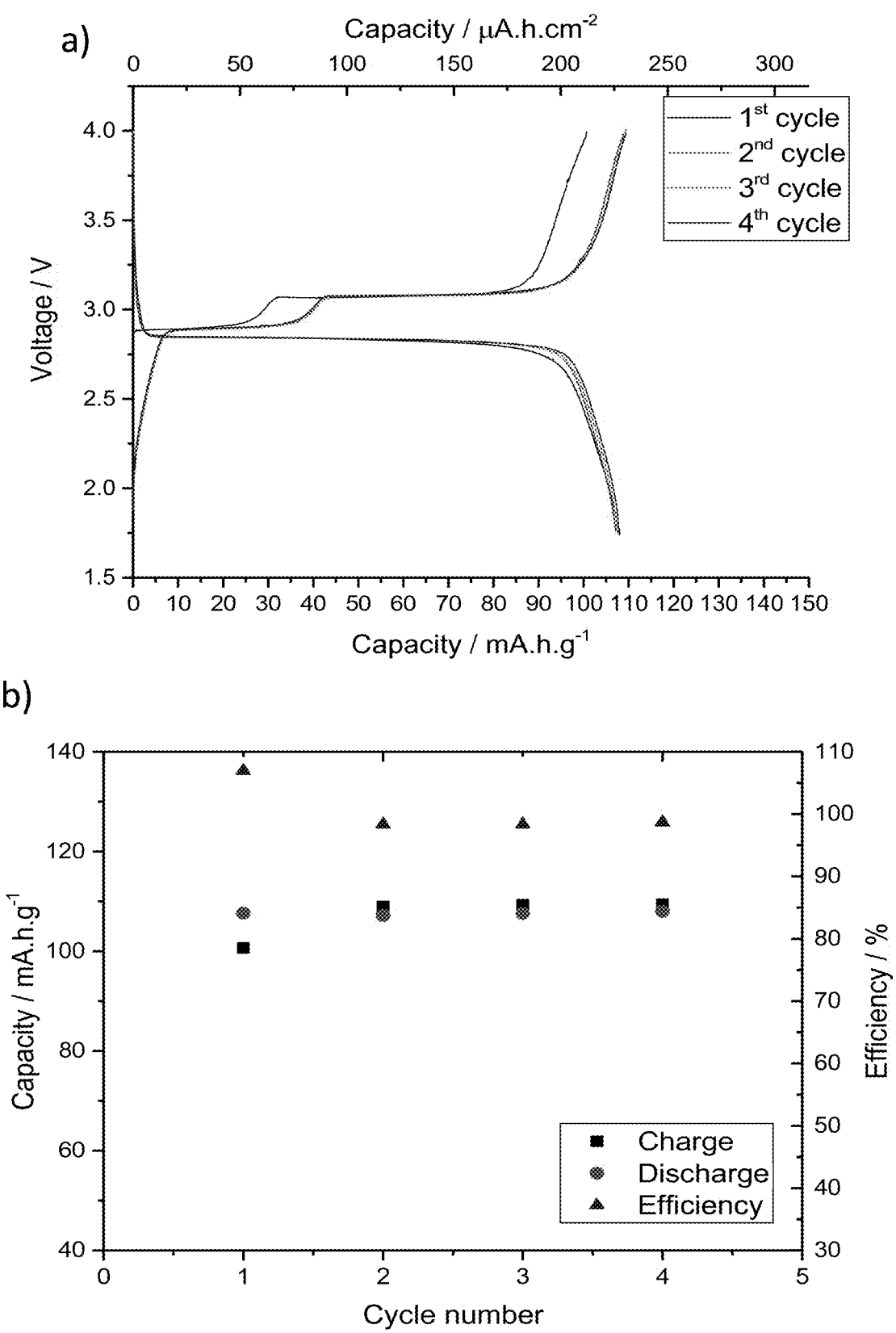
FIG. 17 shows successive charge and discharge capacities recorded during cycling of an embodiment cell comprising a Na$_x$FePO$_4$ positive electrode and a [NaFSI]/[P$_{111i4}$][TFSI] electrolyte with a sodium-ion concentration of 50 mol %: (a) voltage (V) vs. capacity (mA·h·g$^{-1}$ and μA·h·cm$^{-2}$), and (b) maximum capacity (mA·h·g$^{-1}$) and efficiency (%) vs. cycle number.

The cycling performance of sodium electrochemical cells comprising a sodium negative electrode, a $Na_xFePO_4$ positive electrode and a [NaFSI]/[$P_{111i4}$][TFSI] electrolyte is shown in FIG. 17. The data allows appreciating the increase in cell charge capacity as a result of the formation of the SEI layer after the first cycle. The cell is also shown to maintain a stable charge/discharge capacity while cycling. The cell was obtained using a sodium-ion concentration in the electrolyte of 50 mol % and positive material active mass of about 2 mg. The test was performed at 32 µA/cm² (C/5) and at 50° C., during which the cell was cycled between 1.75V and 4V.

Every formulation or combination of components described or exemplified can be used to practice the invention, unless otherwise stated. Specific names of compounds are intended to be exemplary, as it is known that one of ordinary skill in the art can name the same compounds differently.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A sodium electrochemical cell that supports a current density at the negative electrode of at least 500 µA/cm², the electrochemical cell comprising (i) a negative electrode comprising sodium, and (ii) a sodium-ion ionic liquid electrolyte having a sodium-ion concentration that is no less than 75% of its saturation limit in the electrolyte and is at least 40 mol % wherein the negative electrode has a solid-electrolyte interphase (SEI) layer formed as a result of the electrochemical cell having undergone a polarisation cycle, and wherein the electrolyte comprises a phosphonium-based organic salt.

2. The cell according to claim 1 which supports a current density at the negative electrode of at least 500 µA/cm² for at least 20 polarisation cycles.

3. The cell according to claim 1, wherein the current density at the negative electrode is at least 1,000 µA/cm².

4. The cell according to claim 1, wherein the sodium-ion concentration in the electrolyte is no less than 90% of its saturation limit in the electrolyte.

5. The cell according to claim 1, wherein the electrolyte comprises Na[TFSI] and [$C_3$mpyr][TFSI], Na[TFSI] and [$C_4C_3$pyr][TFSI], Na[TFSI] and [$C_3$mpyr][FSI], Na[TFSI] and [$C_4C_3$mpyr][FSI], Na[FSI] and [$C_3$mpyr][TFSI], Na[FSI] and [$C_4C_3$mpyr][TFSI], Na[FSI] and [$C_3$mpyr][FSI], Na[FSI] and [$C_4C_3$mpyr][FSI], or combinations thereof.

6. The cell according to claim 1, wherein the electrolyte comprises sodium(bis(fluorosulfonyl)imide (Na[FSI]) and N-propyl-N-methylpyrrolidinium bis(fluorosulfonyl)imide ($C_3$mpyr[FSI]).

7. The cell according to claim 1, wherein the negative electrode comprises sodium metal.

8. The cell according to claim 1, wherein the negative electrode comprises a sodium/carbon composite.

9. The cell according to claim 1 further comprising a counter electrode.

10. The cell according to claim 1 further comprising a positive electrode.

11. The cell according to claim 10, wherein the positive electrode is a capacitor.

12. A method of manufacturing a sodium electrochemical cell which (i) comprises a negative electrode comprising sodium and a sodium-ion ionic liquid electrolyte having a sodium-ion concentration that is no less than 75% of its saturation limit in the electrolyte and is at least 40 mol %, the electrolyte comprising a phosphonium-based organic salt, and (ii) supports a current density at the negative electrode of at least 500 µA/cm$^2$, the method comprising (i) bringing into contact with the negative electrode the sodium-ion ionic liquid electrolyte, and (ii) performing a polarisation cycle of the cell so as to form at the negative electrode a solid-electrolyte interphase (SEI) layer.

13. The method according to claim 12, wherein the cell further comprises a positive electrode.

14. The method according to claim 12, wherein the sodium-ion concentration in the electrolyte is no less than 90% of its saturation limit in the electrolyte.

15. The method according to claim 12, wherein the electrolyte comprises Na[TFSI] and [C$_3$mpyr][TFSI], Na[TFSI] and [C$_4$C$_3$mpyr][TFSI], Na[TFSI] and [C$_3$mpyr][FSI], Na[TFSI] and [C$_4$C$_3$mpyr][FSI], Na[FSI] and [C$_3$mpyr][TFSI], Na[FSI] and [C$_4$C$_3$mpyr][TFSI], Na[FSI] and [C$_3$mpyr][FSI], Na[FSI] and [C$_4$C$_3$mpyr][FSI], or combinations thereof.

16. The method according to claim 12, wherein the electrolyte comprises sodium(bis(fluorosulfonyl)imide (Na[FSI]) and N-propyl-N-methylpyrrolidinium bis(fluorosulfonyl)imide (C$_3$mpyr[FSI]).

17. The method according to claim 12, wherein the negative electrode comprises sodium metal.

18. The method according to claim 13, wherein the positive electrode is a capacitor.

19. A sodium rechargeable battery that supports a current density at the negative electrode of at least 500 µA/cm$^2$, the battery comprising (i) a negative electrode comprising sodium, (ii) a positive electrode and (iii) a sodium-ion ionic liquid electrolyte having a sodium-ion concentration that is no less than 75% of its saturation limit in the electrolyte and is at least 40 mol %, wherein the negative electrode has a solid-electrolyte interphase (SEI) layer formed as a result of the battery having undergone a polarization cycle, and wherein the electrolyte comprises a phosphonium-based organic salt.

* * * * *